US006712727B2

(12) United States Patent
Kujira et al.

(10) Patent No.: US 6,712,727 B2
(45) Date of Patent: Mar. 30, 2004

(54) MOTOR ACTUATOR

(75) Inventors: Yukinobu Kujira, Toyohashi (JP); Seiji Tateishi, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 24 days.

(21) Appl. No.: 10/072,954

(22) Filed: Feb. 12, 2002

(65) Prior Publication Data
US 2002/0111241 A1 Aug. 15, 2002

(30) Foreign Application Priority Data

| Feb. 13, 2001 | (JP) | 2001-035888 |
| Feb. 13, 2001 | (JP) | 2001-035889 |
| Feb. 13, 2001 | (JP) | 2001-035890 |
| Feb. 13, 2001 | (JP) | 2001-035891 |
| Feb. 23, 2001 | (JP) | 2001-048126 |
| Mar. 6, 2001 | (JP) | 2001-062023 |

(51) Int. Cl.⁷ ............................................. F16H 48/06
(52) U.S. Cl. ......................... 475/149; 74/425; 475/343
(58) Field of Search ............................ 74/425; 475/343, 475/149, 331, 339, 340; 454/121

(56) References Cited

U.S. PATENT DOCUMENTS

| 3,764,162 A | * | 10/1973 | Rawlings | 280/764.1 |
| 4,093,180 A | * | 6/1978 | Strabala | 251/248 |
| 4,133,344 A | * | 1/1979 | Hunter et al. | 239/728 |
| 4,616,528 A | * | 10/1986 | Malinski et al. | 475/4 |
| 4,641,887 A | * | 2/1987 | Klueting | 297/362 |
| 4,693,425 A | * | 9/1987 | Meis et al. | 239/735 |
| 5,205,371 A | * | 4/1993 | Karnopp | 180/444 |
| 5,484,345 A | * | 1/1996 | Fukaya | 475/162 |
| 5,823,905 A | * | 10/1998 | Torii et al. | 475/149 |
| 5,937,507 A | * | 8/1999 | Asakura et al. | 29/596 |
| 6,129,337 A | * | 10/2000 | Wu | 251/248 |
| 6,162,142 A | * | 12/2000 | Hori et al. | 475/149 |
| 6,315,690 B1 | * | 11/2001 | Myers, Sr. | 475/7 |

FOREIGN PATENT DOCUMENTS

| JP | 09156346 A | * | 6/1997 | B60H/1/00 |
| JP | 10297275 A | * | 11/1998 | B60H/1/34 |
| JP | 11348538 A | * | 12/1999 | B60H/1/00 |

* cited by examiner

Primary Examiner—Rodney H. Bonck
Assistant Examiner—David D. Le
(74) Attorney, Agent, or Firm—Posz & Bethards, PLC

(57) ABSTRACT

The motor actuator includes a driving motor, and a motor gear formed on a rotary shaft of the driving motor. The motor actuator further includes an input gear which meshes with the motor gear, and a planet gear revolving around a rotation axis of the input gear when the input gear is rotated. It further includes a stationary gear which is fixed in a coaxial relation with the input gear, and meshes with the planet gear. It further includes an output gear which is disposed rotatably in a coaxial relation with the input gear, has an output shaft and teeth whose number is different from that of the stationary gear, and meshes with the planet gear. With this configuration, the motor actuator is preferably small and reliable, and provides preferable output characteristics in torque and rotational speed.

33 Claims, 16 Drawing Sheets

MOTOR ACTUATOR

CROSS REFERENCE TO RELATED APPLICATION

This application is based on and incorporates herein by reference Japanese Patent Applications No. 2001-35888, No. 2001-35889, No. 2001-35890, No. 2001-35891 filed on Feb. 13, 2001, No. 2001-48126 filed on Feb. 23, 2001, and No. 2001-62023 filed on Mar. 6, 2001.

FIELD OF THE INVENTION

The present invention relates to a motor actuator including a gear drive train in combination with a planetary gear train. The present invention is preferably applied to, for example, an air conditioning system for a vehicle to open and close a damper of an air passage.

BACKGROUND OF THE INVENTION

A motor actuator used in an air conditioning system for a vehicle to open and close a damper of an air passage needs low rotational speed (e.g., 5–10 rpm) and high torque (e.g., 1–2.5 N·m). However, a DC motor used for the actuator rotates normally at 2000–5000 rpm with 0.005–0.02 N·m. Therefore, a gear drive train having a high speed reduction ratio is inevitable for the above characteristics. A gear drive train constituting a plurality of spur gears, which are multiply combined with each other, is proposed for the motor actuator. However, that type of gear drive train is relatively expensive because a plenty of spur gears are usually used. Otherwise, a larger spur gear having more teeth needs to be used to gain a preferable speed reduction ratio. That results in an unfavorably sizeable actuator.

Besides, the above gear drive train can cause unfavorable mechanical noise and vibration due to imbalance in dynamic meshes between the gears, or the like. The noise and vibration caused by the gear drive train must be suppressed because the motor actuator applied to a damper of an air passage in an air conditioning system for a vehicle is usually mounted close to a driver's seat.

SUMMARY OF THE INVENTION

The present invention has been made in view of the above aspects with an object to provide a compact and silent motor actuator having a gear drive train with a high speed reduction ratio. To accomplish the object, in the present invention, a planetary gear train is applied to a motor actuator.

The motor actuator includes a driving motor, and a motor gear formed on a rotary shaft of the driving motor. The motor actuator further includes an input gear which meshes with the motor gear, and a planet gear revolving around a rotation axis of the input gear when the input gear is rotated. It further includes a stationary gear which is fixed in a coaxial relation with the input gear, and meshes with the planet gear. It further includes an output gear which is different in the number of teeth from the stationary gear, is disposed rotatably in a coaxial relation with the input gear, has an output shaft, and meshes with the planet gear.

When the input gear is driven by the driving motor, the input gear is rotated at a predetermined reduced speed. At the same time, the planet gear is revolved around the rotation axis of the input gear while being rotated about its own axis. By the planetary movement of the planet gear, the output gear is rotated due to the difference in the number of teeth between the stationary gear and the output gear. Namely, when the planet gear goes around the axis once, the output gear is rotated by an angle equivalent to the difference in the number of teeth. Therefore, it is possible to rotate the output gear at a predetermined reduced speed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
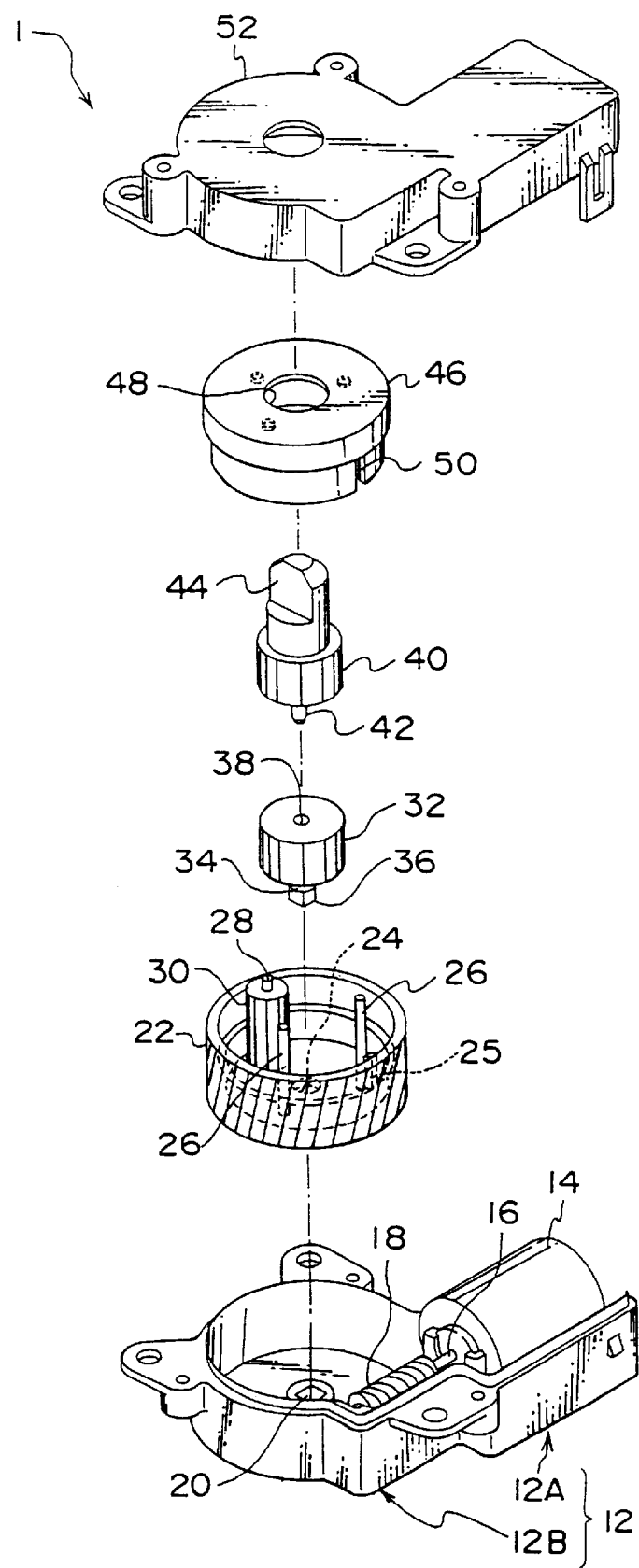
FIG. 1 is an exploded perspective view of a motor actuator according to a first embodiment of the present invention.

The present invention will be described in detail with reference to various embodiments, in which the same reference numerals designate common members.

(First Embodiment)

Figure 2:
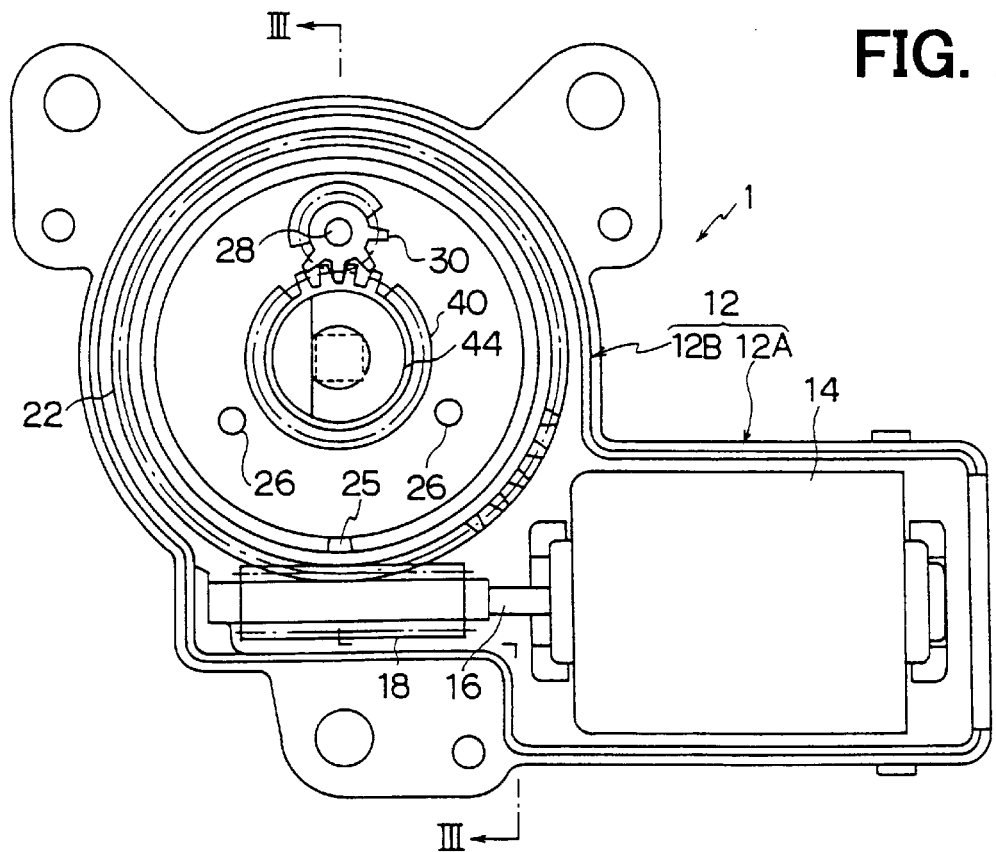
FIG. 2 is a plan view of the motor actuator according to the first embodiment, in which an upper case and a wheel cover are omitted.
Figure 3:
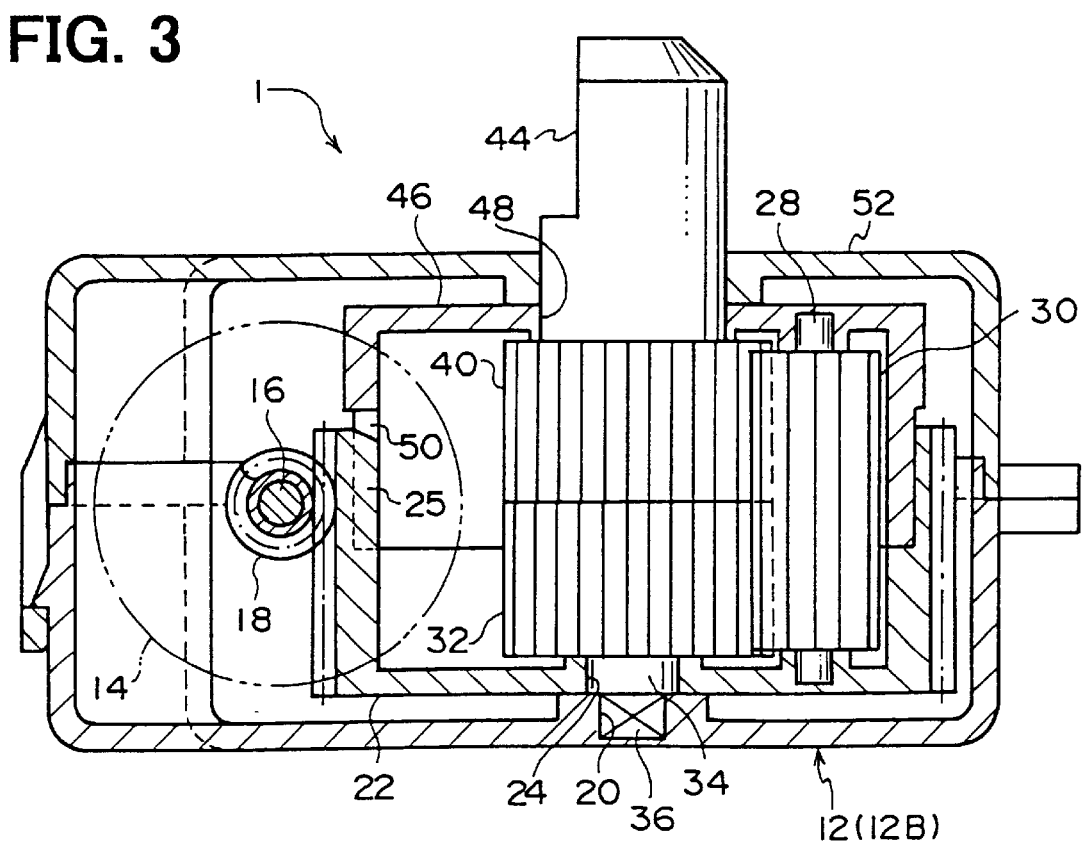
FIG. 3 is a cross-sectional view of the motor actuator taken along the line III—III in FIG. 2.

Referring to FIG. 1 to 3, a motor actuator 1 has a lower case 12 constituted of a motor storage 12A and a gear storage 12B. The motor storage 12A stores a driving motor 14. The driving motor 14 has a rotary shaft 16 and a worm 18 which is a motor gear attached on the shaft 16, and spins at 4000 rpm.

The gear storage 12B has a cavity 20 at the bottom thereof, which fits a shaft 34 of a sun gear 32. The cavity 20 need not necessarily penetrate the bottom of the gear storage 12B. The gear storage 12B stores a worm wheel 22 which is an input gear. The worm wheel 22 is formed in a bottomed cylinder shape, and has teeth on the outer surface thereof, which mesh with threads of the worm 18. The worm wheel 22 is stored in such a manner that the rotation axis thereof is perpendicular to that of the worm 18. Therefore, the worm wheel 22 is rotated at a predetermined reduced speed in comparison with the rotational speed of the driving motor 14. In this embodiment, the worm wheel 22 is rotated at 100 rpm when the motor 14 spins at 4000 rpm.

The worm wheel 22 has a hole 24 at the central part of the bottom thereof, a projection 25 on the inner surface thereof, a pair of pillars 26, and a support shaft 28. The pillars 26 and a support shaft 28 are held upright on the bottom of the worm wheel 22. The support shaft 28 supports rotatably a planet gear 30 revolving around the rotation axis of the worm wheel 22 when the worm wheel 22 is rotated. The pillars 26 and the support shaft 28 have an equal diameter.

The worm wheel 22 stores the sun gear 32 having the shaft 34 at one end and a support cavity 38 at the other end on the axis thereof which corresponds to the rotation axis of the worm wheel 22. The shaft 34 has a cubic-shaped edge 36 which fits the cavity 20 formed at the bottom of the gear storage 12B via the hole 24 formed at the central part of the bottom of the worm wheel 22, so the sun gear 32 is a stationary gear, which is not rotatable. In this embodiment, the sun gear 32 has twenty-one teeth.

The sun gear 32 is joined to an output gear 40 having a support pillar 42 at one axial end and an output shaft 44 at the other axial end on the rotation axis thereof, which is identical with the rotation axis of the worm wheel 22. The support pillar 42 fits the support cavity 38 of the sun gear 32 so that the output gear 40 is supported rotatably. In this embodiment, the output gear 40 has twenty-two teeth.

The planet gear 30 engages the sun gear 32, so when the worm wheel 22 is rotated, the planet gear 30 is revolved around the sun gear 32 and the output gear 40 while being rotated about its own axis. The worm wheel 22 storing the sun gear 32, the output gear 40, and the planet gear 30 is covered with a wheel lid (an input gear lid) 46. The wheel lid 46 has a communication hole 48 at the central part and a slit 50 on the side wall thereof. The wheel lid 46 is attached to, and integrated with the worm wheel 22 so as to shield the gear train constituted of the planet gear 30, the sun gear 32, and the output gear 40 while letting the slit 50 fit the projection 25 on the inner surface of the worm wheel 22, and letting the output shaft 44 penetrate an upper case 52 through the communication hole 48. The output shaft 44 is used to rotate a damper (not shown). The lower case 12 storing the driving motor 14, the worm wheel 22 or the like is covered, and substantially shielded with the upper case 52.

Figure 16:
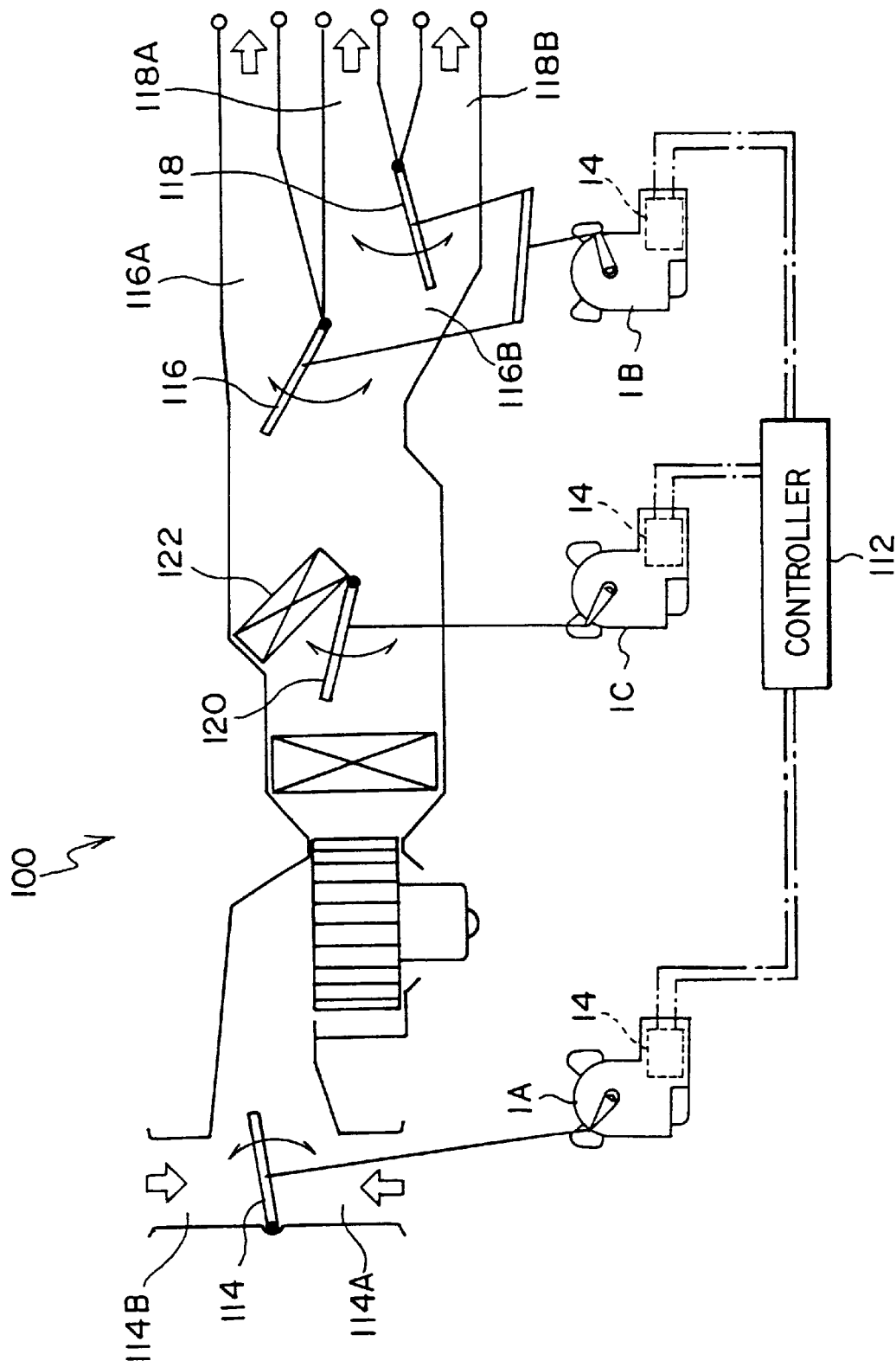
FIG. 16 is a schematic view of an air conditioning system for a vehicle to which each motor actuator according to the first to the sixth embodiments is applied.

In this embodiment, when the worm wheel 22 is driven by the driving motor 14, the worm wheel 22 is rotated at a predetermined reduced speed. In this embodiment, the speed reduction ratio is 1:40. At the same time, the planet gear 30 is revolved around the sun gear 32 with the wheel gear 22 while being rotated about its own axis because the sun gear 32 is not rotatable. By the planetary movement of the planet gear 30, the output gear 40 is rotated due to the difference in the number of teeth between the sun gear 32 (twenty-one teeth) and the output gear 40 (twenty-two teeth). To be specific, when the planet gear 30 goes around the sun gear 32 once, the output gear 40 is rotated by an angle due to the difference in the number of teeth (in this embodiment, one tooth). Therefore, it is possible to rotate the output gear 40 at a predetermined reduced speed. In this embodiment, the speed reduction ratio is 1:22. Thus, the motor actuator 1 provides a high overall speed reduction ratio (in this embodiment, 1:(40×22)) through the first reduction between the worm 18 and the worm wheel 22 and the second reduction between the planet gear 30, the sun gear 32, and the output gear 40. The motor actuator 1 is preferably used to open and close a damper of an air passage in an air conditioning system 100 for a vehicle, as shown in FIG. 16.

In this embodiment, a sizeable spur gear having a number of teeth is not used. Instead, the worm 18 is used as a gear for the motor 14, the worm wheel 22, which supports the planet gear 30, the sun gear 32, and the output gear 40, is used as a ring gear having a rotation axis perpendicular to that of the worm 18. Therefore, it is possible to provide a preferably compact and affordable motor actuator having a gear train with high speed reduction ratio.

The wheel lid 46 is integrated with the worm wheel 22 so as to shield the gear train constituted of the planet gear 30, the sun gear 32, and the output gear 40. In addition, the integrated body is further shielded by the lower case 12 and the upper case 52. Therefore, the motor actuator 1 is doubly soundproofed, so the mechanical noise caused by the gear train is preferably suppressed. The wheel lid 46 is integrated with the worm wheel 22 by letting the slit 50 fit the projection 25 on the inner surface of the worm wheel 22, so the worm wheel 22 and the wheel lid 46 are relatively unmovable from each other.

In this embodiment, it is possible to alter the rotational speeds of the driving motor 14 and the worm wheel 22 (i.e., the first speed reduction ratio), the numbers of teeth in the sun gear 32 and the output gear 40 (i.e., the second speed reduction ratio), or the like on a case-by-case basis. Each value referred in this embodiment is only an example.

(Second Embodiment)

Figure 4:
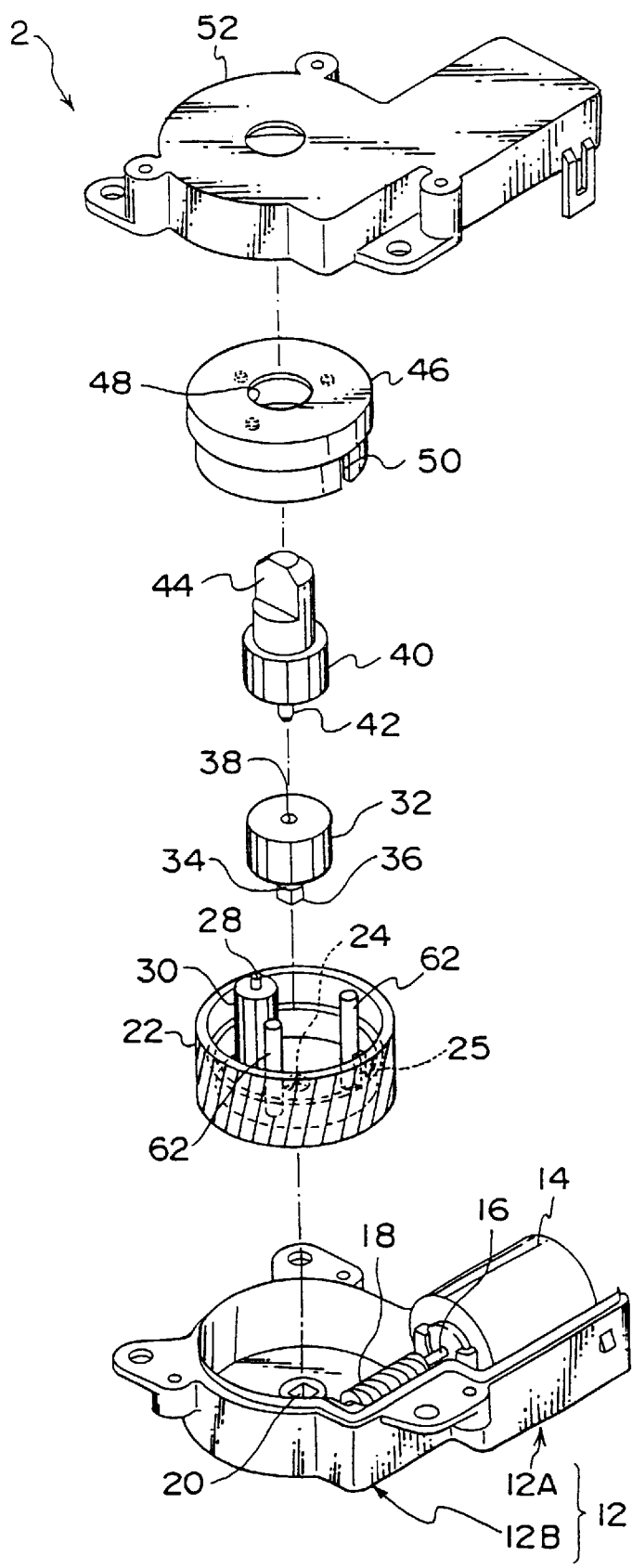
FIG. 4 is an exploded perspective view of a motor actuator according to a second embodiment of the present invention.
Figure 5:
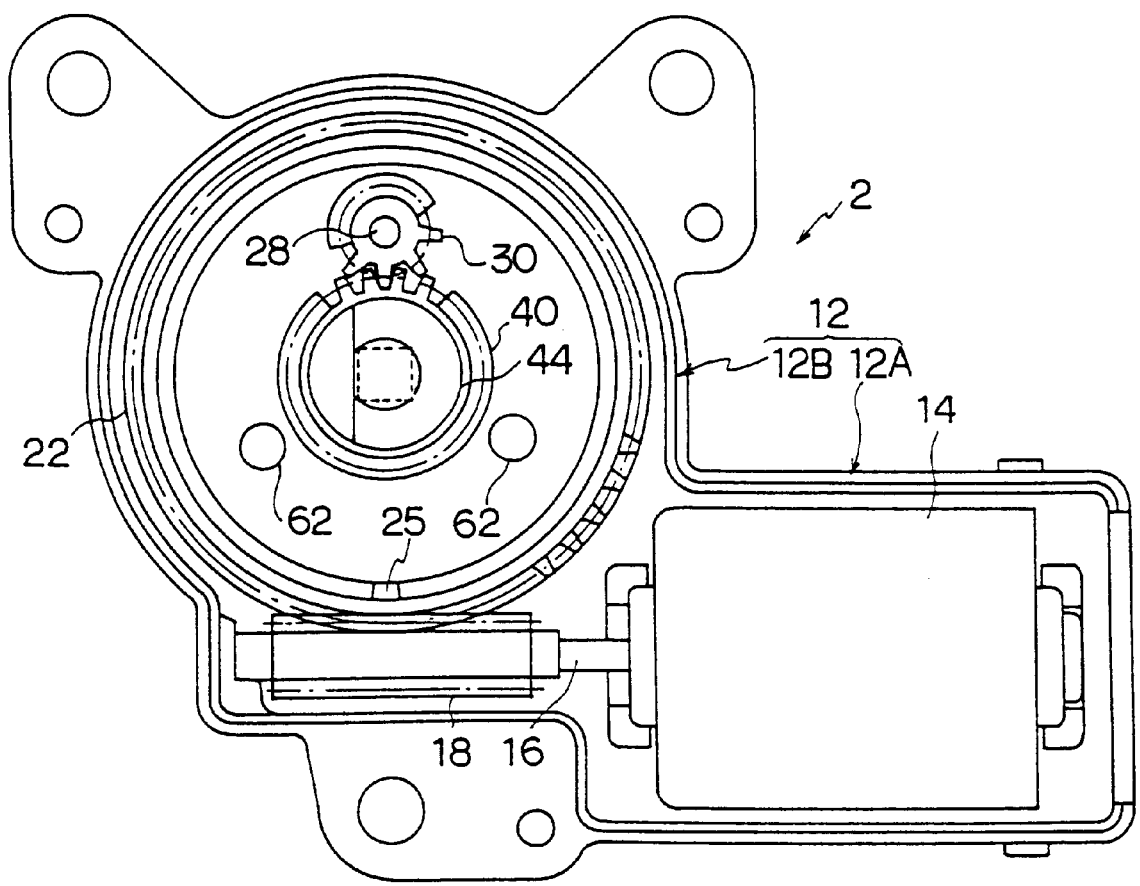
FIG. 5 is a plan view of the motor actuator according to the second embodiment, in which an upper case and a wheel cover are omitted.

As shown in FIGS. 4 and 5, in a motor actuator 2 according to the second embodiment, a pair of pillars 62 have a larger diameter than the support shaft 28 so as to provide preferable shaft balance when the worm wheel 22 is rotated while carrying the support shaft 28, the planet gear 30 supported by the shaft 28, and the pillars 62.

Because each pillar 26 has a larger diameter than the support shaft 28, the mechanical noise and vibration due to shaft imbalance of the worm wheel 22 during rotation is preferably prevented. Therefore, it is possible to improve noise level of the motor actuator 2 in operation thereof.

In this embodiment, the two pillars 62 are held upright on the bottom of the worm wheel 22. However, the number and the position of the pillar 62 are variable. For example, it is possible to provide preferable shaft balance by holding upright only one pillar 26 having a predetermined larger diameter on the bottom in a symmetrical relation with the support shaft 28 in relation to the rotation axis of the worm wheel 22.

(Third Embodiment)

Figure 6:
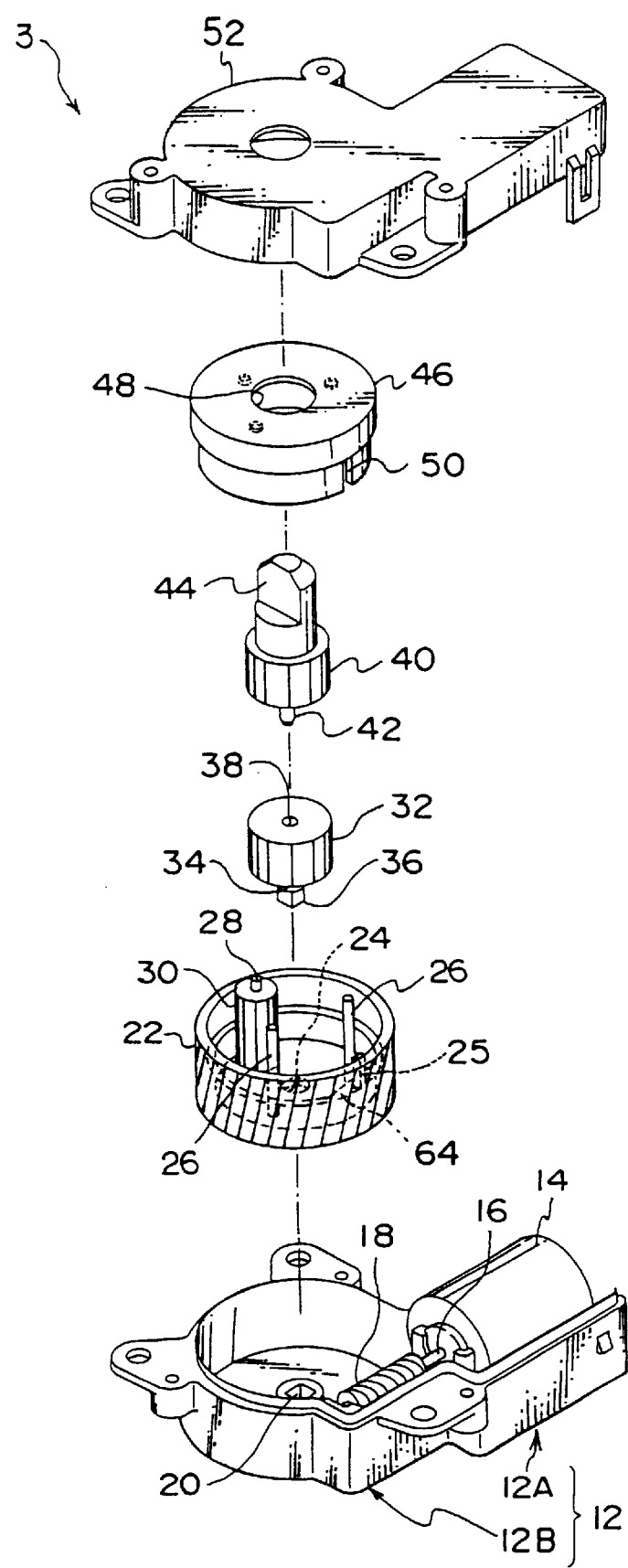
FIG. 6 is an exploded perspective view of a motor actuator according to a third embodiment of the present invention.
Figure 7:
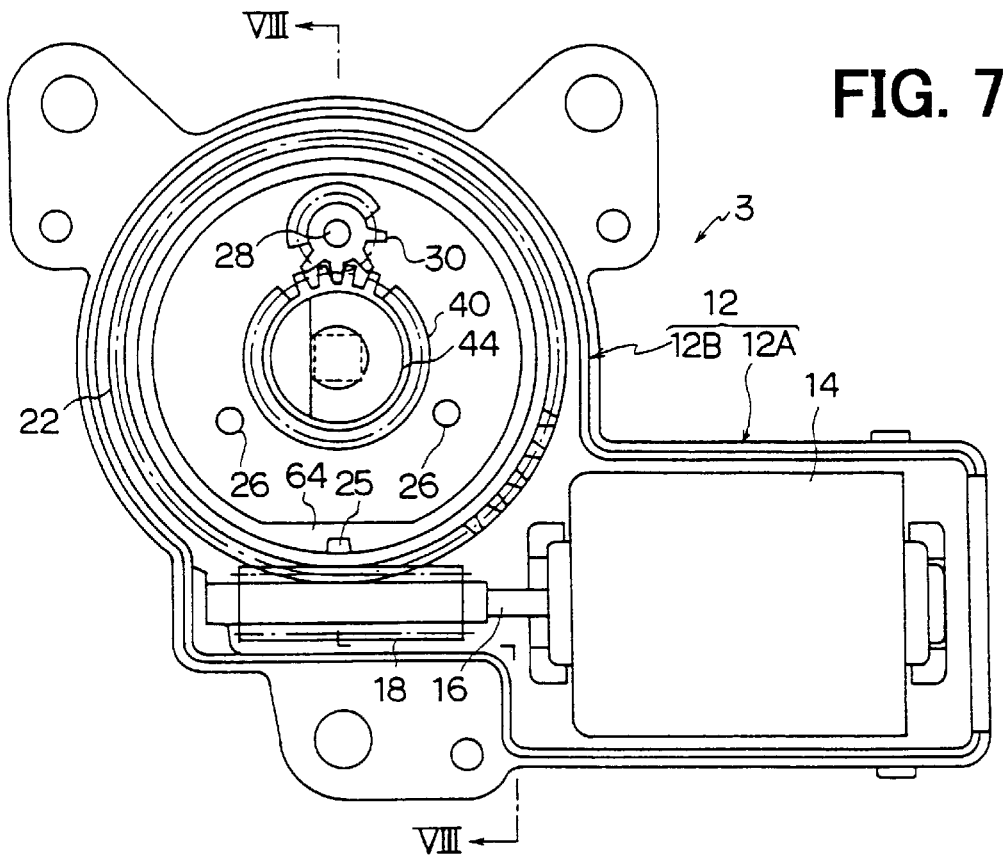
FIG. 7 is a plan view of the motor actuator according to the third embodiment, in which an upper case and a wheel cover are omitted.
Figure 8:
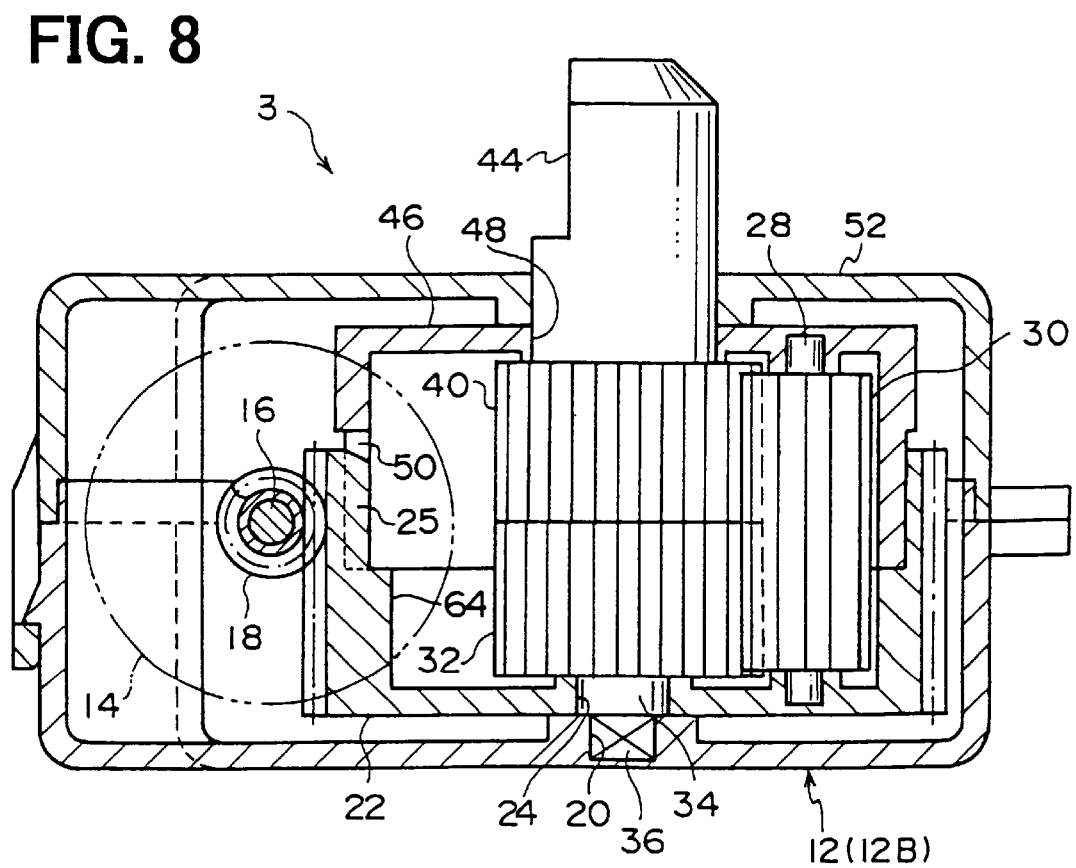
FIG. 8 is a cross-sectional view of the motor actuator taken along the line VIII—VIII in FIG. 7.

As shown in FIGS. 6 to 8, in a motor actuator 3 according to the third embodiment, a pair of pillars 26 having the same diameter as of the support shaft 28, which supports rotatably the planet gear 30, are held upright on the bottom of the worm wheel 22. Instead, the worm wheel 22 has a counterweight part 64 formed on the side wall in a symmetrical relation with the planet gear 30 (the support shaft 28) in relation to the rotation axis of the worm wheel 22. The counterweight part 64 has a larger side wall thickness than the rest of the side wall so as to provide preferable shaft balance when the worm wheel 22 is rotated while carrying the support shaft 28, the planet gear 30 supported by the shaft 28, and the pillars 26.

In the third embodiment as well, it is also possible to provide a preferably compact and affordable motor actuator including a gear drive train having high speed reduction ratio. The motor actuator 3 is also doubly soundproofed, so the mechanical noise caused by the gear train is preferably suppressed. In addition, the worm wheel 22 has the counterweight part 64 formed on the side wall so as to provide preferable shaft balance, so the mechanical noise and vibration due to shaft imbalance of the worm wheel 22 while rotating is preferably prevented.

In this embodiment, the counterweight part 64, whereby preferable shaft balance of the worm wheel 22 is provided, is formed on the inner surface of the side wall of the worm wheel 22. However, the counterweight part 64 for the shaft balance may be formed at a position on the bottom surface of the worm wheel 22, a preferable surface of the wheel lid 46 which rotates synchronously with the worm wheel 22, or the like. Although the counterweight part 64 is integrated with the worm wheel 22 in this embodiment, the part may be formed separately and attached to a preferable position on the worm wheel 22 or the wheel lid 46. In addition, the number of the counterweight part 64 is not limited to one. A plurality of counterweight parts may be used.

(Fourth Embodiment)

Figure 9:
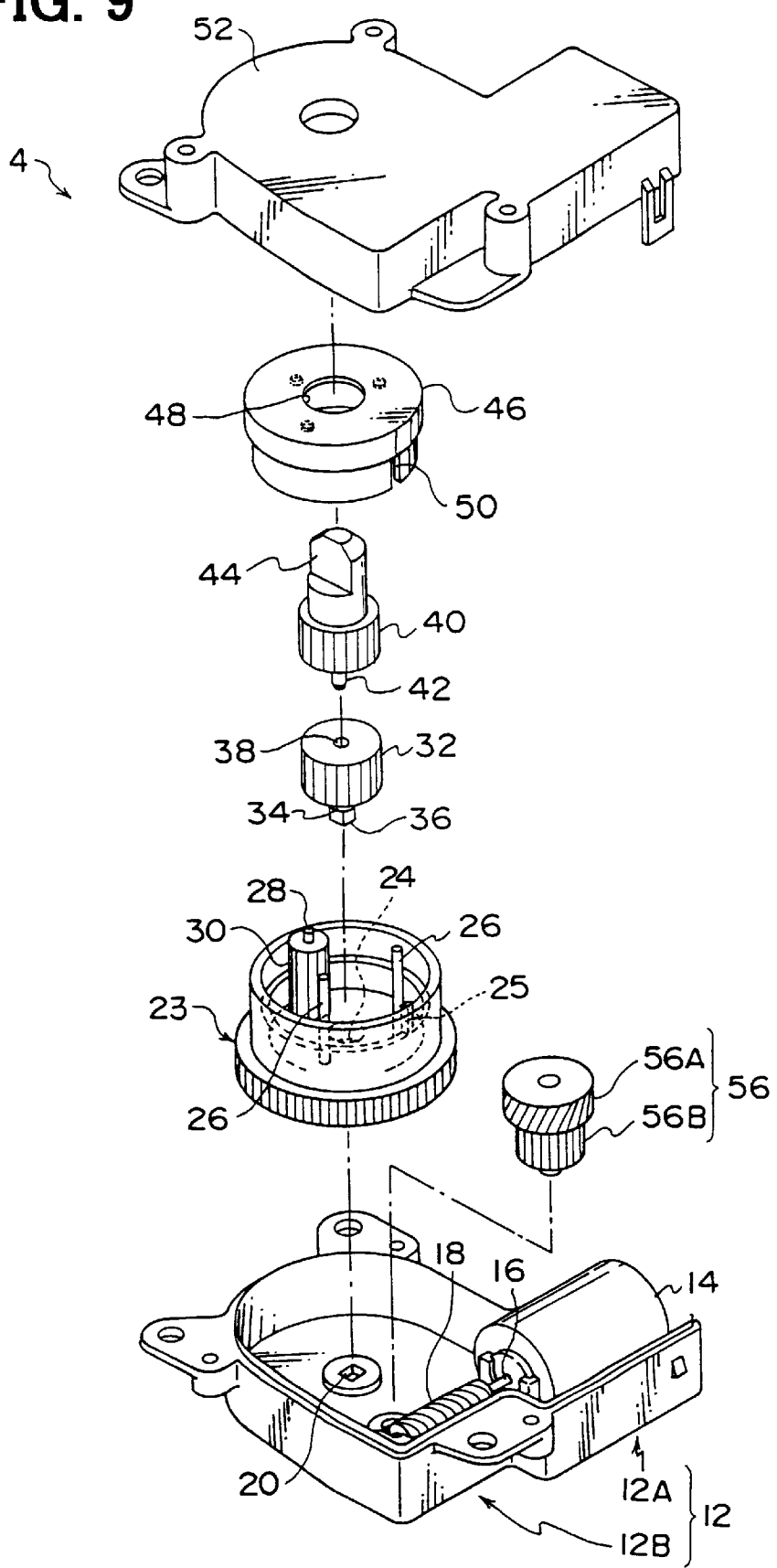
FIG. 9 is an exploded perspective view of a motor actuator according to a fourth embodiment of the present invention.
Figure 10:
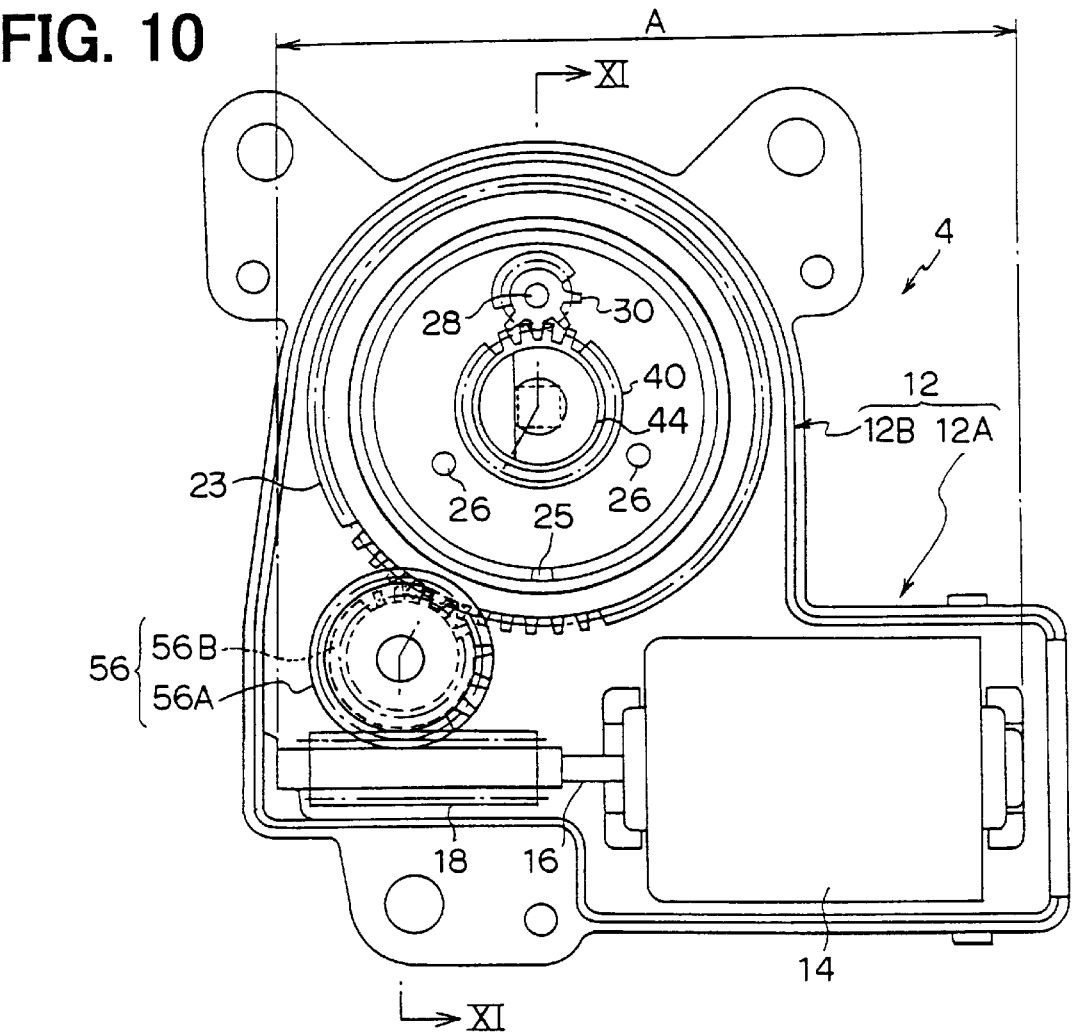
FIG. 10 is a plan view of the motor actuator according to the fourth embodiment, in which an upper case and a wheel cover are omitted.
Figure 11:
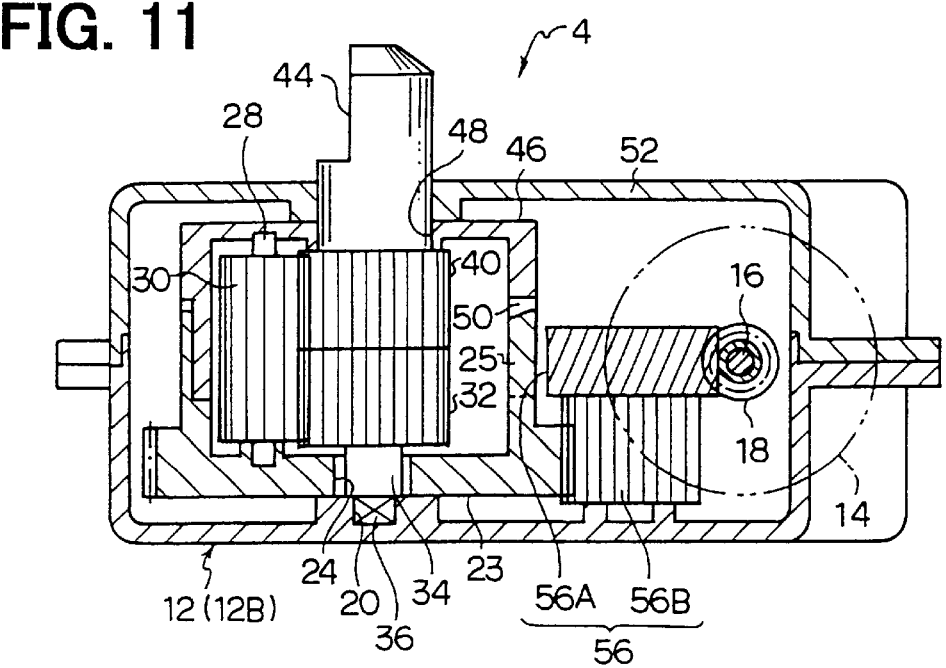
FIG. 11 is a cross-sectional view of the motor actuator taken along the line XI—XI in FIG. 10.

As shown in FIGS. 9 to 11, in a motor actuator 4 according to the fourth embodiment, an intermediate gear 56 is disposed between the worm 18 and the worm wheel 23. The intermediate gear 56 is a double spur gear including a large gear part 56A and a small gear part 56B, which has a smaller diameter than the large gear part 56A, and is integrated with the large gear part 56A. The gear part 56A and the gear part 56B have a common rotation axis, and rotate synchronously with each other. The intermediate gear 56 is disposed in such a manner that the rotation axis thereof is perpendicular to that of the worm 18 of the driving motor 14. The teeth of the large gear part 56A engage threads of the worm 18, so the intermediate gear 56 is rotated at a predetermined reduced speed in comparison with the rotational speed of the motor 14. In this embodiment, the intermediate gear 56 is rotated at 100–200 rpm when the motor 14 is rotated at 4000 rpm.

The gear storage 12B stores the worm wheel 23. The worm wheel 23 is stored in such a manner that the rotation axis thereof is perpendicular to that of the worm 18. In this embodiment, as shown in FIG. 10, the worm wheel 23 is disposed within the range A defined by the overall axial length of the motor 14, the rotary shaft 16 and the worm 18. Therefore, it is possible to downsize the actuator 4 in the rotation axis direction of the shaft 16 in comparison with the actuators in the above embodiments. The worm wheel 23 is formed in a bottomed cylinder shape, and has teeth on the outer surface close to the bottom thereof. The worm wheel 23 meshes with the small gear part 56B. Therefore, the worm wheel 23 is rotated at a predetermined reduced speed in comparison with the rotational speed of the intermediate gear 56 (the driving motor 14). In this embodiment, the worm wheel 23 is rotated at 25–100 rpm when the intermediate gear 56 is rotated at 100–200 rpm.

In this embodiment, when the large gear part 56A is rotated at a predetermined reduced rotational speed by the worm 18 driven by the driving motor 14, the small gear part 56B is rotated at the same rotational speed. In this embodiment, the speed reduction ratio is in the range of 1:20–1:40. At the same time, the worm wheel 23 is rotated at a predetermined reduced speed by the small gear part 56B. In this embodiment, the speed reduction ratio is in the range of 1:2–1:4.

When the worm wheel 23 is rotated by the small gear part 56B, the planet gear 30 is revolved around the sun gear 32 while being rotated about its own axis because the sun gear 32 is not rotatable. By the planetary movement of the planet gear 30, the output gear 40 is rotated due to the difference in the number of teeth between the sun gear 32 and the output gear 40. Therefore, it is possible to rotate the output gear 40 at a predetermined reduced speed. In this embodiment the speed reduction ratio is 1:22. Thus, the motor actuator 4 provides a high overall speed reduction ratio (1:((20–40)×(2–4)×22)) through the first reduction between the worm 18 and the large gear part 56A, the second reduction between the large gear part 56A and the small gear part 56B, the third reduction between the small gear part 56B and the worm wheel 22, and the fourth reduction between the planet gear 30, the sun gear 32, and the output gear 40.

(Fifth Embodiment)

Figure 12:
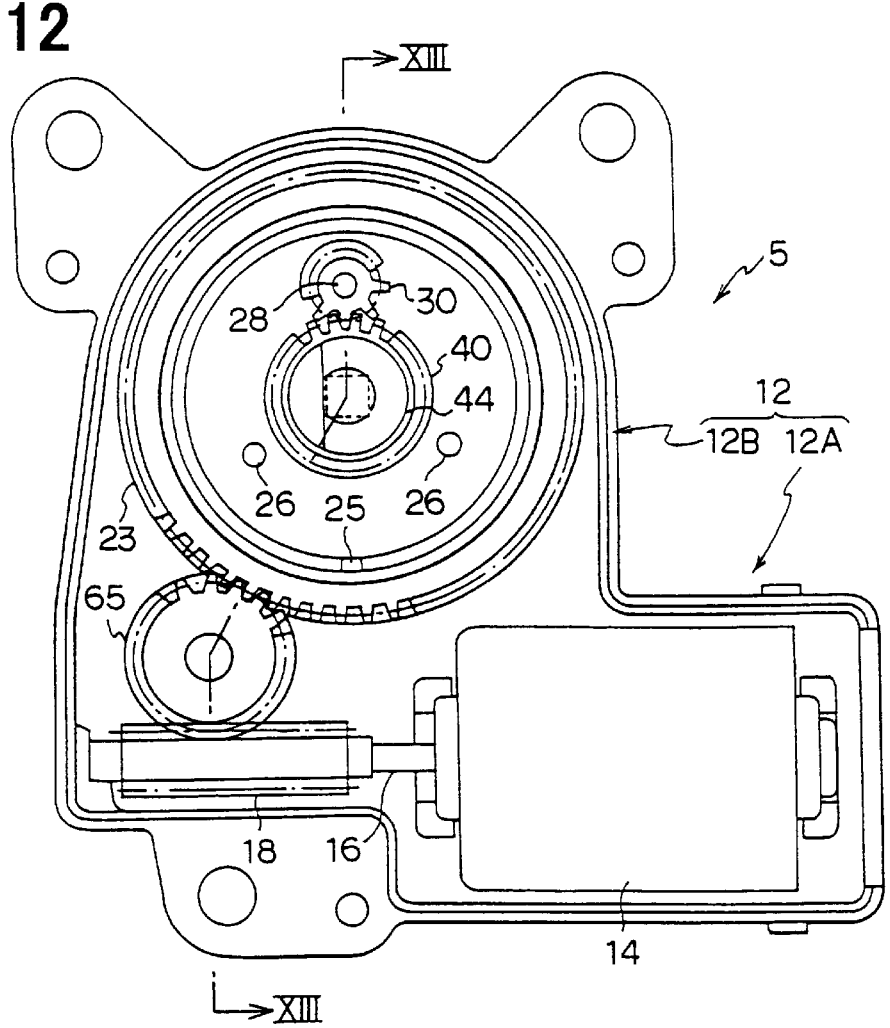
FIG. 12 is a plan view of the motor actuator according to a fifth embodiment, in which an upper case and a wheel cover are omitted.
Figure 13:
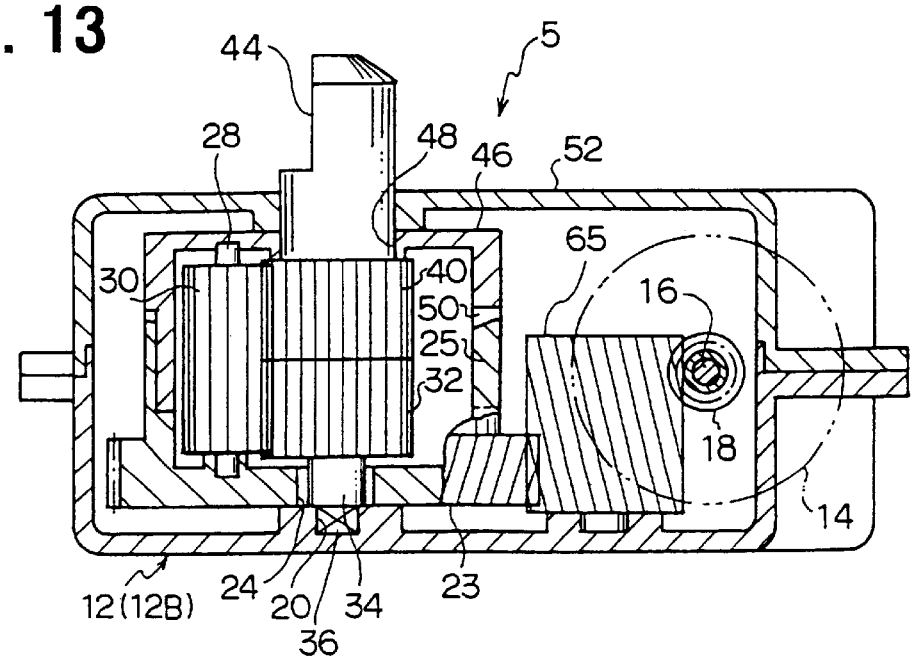
FIG. 13 is a cross-sectional view of the motor actuator taken along the line XIII—XIII in FIG. 12.

As shown in FIGS. 12 and 13, in a motor actuator 5 according to the fifth embodiment, an intermediate gear 65, which is a spur gear, is disposed between a worm 18 and a worm wheel 23. In this aspect, the motor actuator 5 in the fifth embodiment is mainly different from the motor actuator 4 in the fourth embodiment. The intermediate gear 65 is disposed in such a manner that the rotation axis thereof is perpendicular to that of a worm 18 of a driving motor 14. The teeth of the intermediate gear 65 engage threads of the worm 18, so the intermediate gear 65 is rotated at a predetermined reduced speed in comparison with the spin speed of the motor 14. In this embodiment, the intermediate gear 65 is rotated at 200–400 rpm when the motor 14 spins at 4000 rpm, namely the speed reduction ratio is in the range of 1:10–1:20.

The worm wheel 23 has teeth on the outer surface close to the bottom thereof, which mesh with the teeth of the intermediate gear 65. Therefore, the worm wheel 23 is rotated at a predetermined reduced speed in comparison with the rotational speed of the intermediate gear 65 (the driving motor 14). In this embodiment, the worm wheel 23 is rotated at 50–200 rpm when the intermediate gear 65 is rotated at 200–400 rpm, namely the speed reduction ratio is in the range of 1:2–1:4. Besides, in this embodiment, the speed reduction ratio between the planet gear 30, the sun gear 32, and the output gear 40 is 1:22. Therefore, the motor actuator 5 provides a high overall speed reduction ratio (1:((10–20)×(2–4)×22)) through the first reduction between the worm 18 and the intermediate gear 65, the second reduction between the intermediate gear 65 and the worm wheel 22, and the third reduction between the planet gear 30, the sun gear 32, and the output gear 40.

(Sixth Embodiment)

Figure 14:
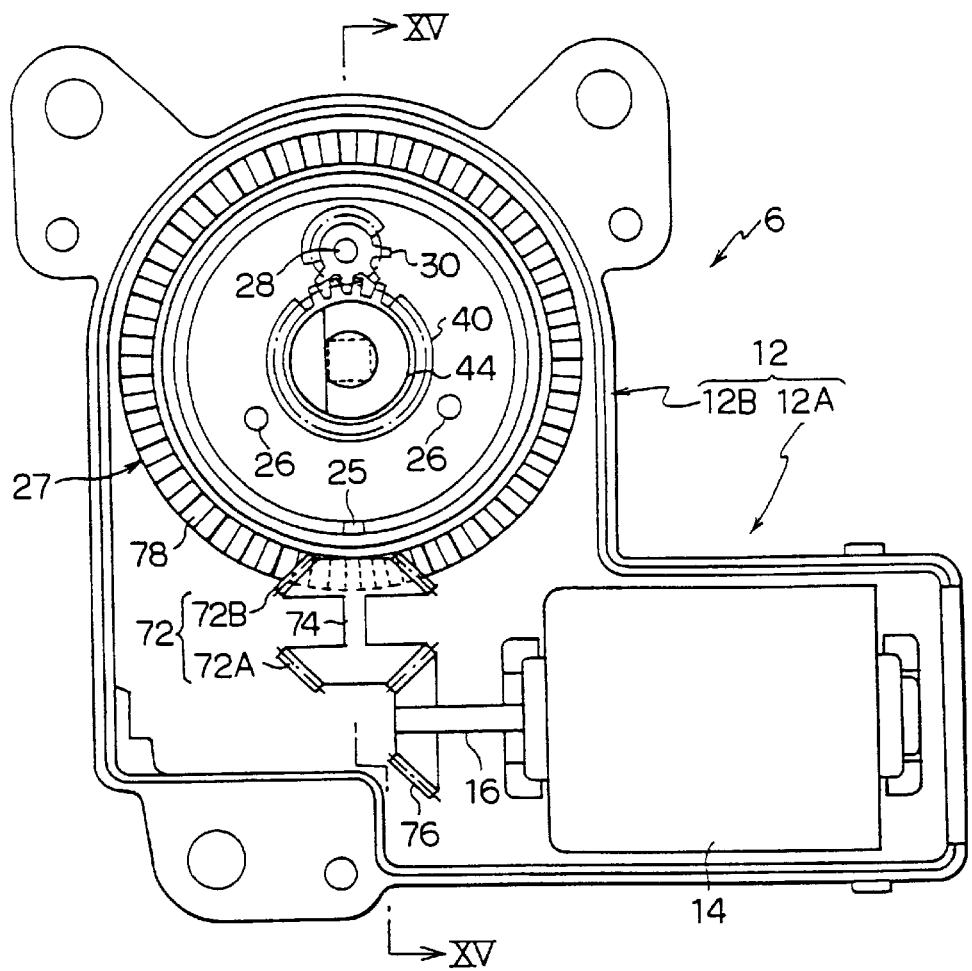
FIG. 14 is a plan view of the motor actuator according to a sixth embodiment, in which an upper case and a wheel cover are omitted.
Figure 15:
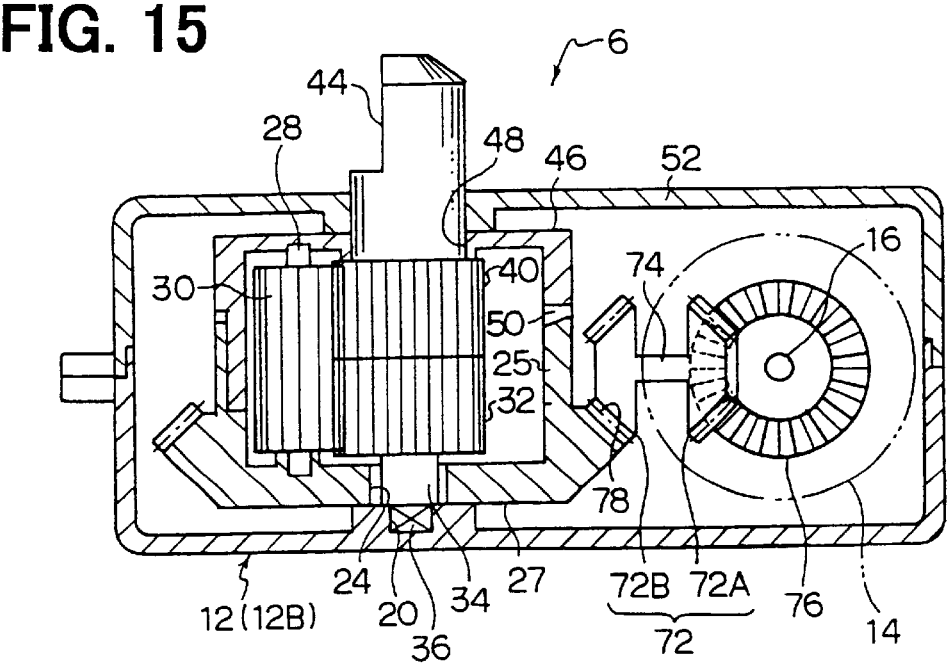
FIG. 15 is a cross-sectional view of the motor actuator taken along the line XV—XV in FIG. 14.

As shown in FIGS. 14 and 15, the motor actuator 6 according to the sixth embodiment includes an intermediate gear 72 constituted of a pair of bevel gears 72A and 72B and a shaft 74 connecting the gears 72A and 72B. The bevel gears 72A and 72B engage respectively a bevel gear 76 formed on the rotary shaft 16 of the driving motor 14 and a bevel gear 78 formed on the outer surface of a worm wheel 27. The intermediate gear 72 is rotated at a predetermined reduced speed in comparison with the spin speed of the motor 14, and the worm wheel 27 is rotated at a predetermined reduced speed in comparison with the rotational speed of the intermediate gear 76 (the driving motor 14).

In this embodiment, as well as in the fourth embodiment, by the planetary movement of the planet gear 30, the output gear 40 is rotated at a predetermined reduced speed due to the difference in the number of teeth between the sun gear 32 and the output gear 40. Therefore, the motor actuator 6 provides a high overall speed reduction ratio through the multiplicative reduction thereof.

The intermediate gear 72 including the bevel gears 72A and 72B is used in this embodiment, so the motor actuator 6 has higher transmission efficiency between gears than the motor actuator 4, 5 in which the worm 18 is used. In stead of a pair of bevel gears 72A, 76 (72B, 78), a pair of hypoid gears, which are a hyperboloidal gear, may be used. Thereby, a motor actuator can be further downsized.

The motor actuators 1 to 6 are preferably used to open and close a damper of an air passage in an air conditioning system 100 for a vehicle. Hereinafter, the basic operation of damper control in the air conditioning system 100 for a vehicle, in which the motor actuator 1 is used as an example, will be described with reference to FIG. 16.

The air conditioning system 100 has three motor actuators 1 denoted respectively by 1A, 1B, and 1C. The terminal of the driving motor 14 in each motor actuator 1A, 1B, 1C is electrically connected to a controller 112, and the motor 14 is driven clockwise or counterclockwise in response to the signal from the controller 112. The motor actuator 1A is mechanically connected to drive a damper 114 which switches air flow path between a duct 114A for introducing interior air and a duct 114B for introducing exterior air. The motor actuator 1B is mechanically connected to drive dampers 116 and 118 for switching air flow path. The damper 116 switches air flow path between a duct 116A leading to a defroster and a duct 116B leading to interior air outlet ports. The damper 118 switches air flow path between a duct 118A leading to an air outlet port close to the instrument panel and a duct 118B leading to an air outlet port close to passengers' feet. The motor actuator 1C is mechanically connected to drive a damper 120 for controlling air mixing rate between hot air generated by a heater core 122 and cool air.

Each motor actuator 1A, 1B, 1C is downsized by using the gear drive system described above, so each actuator 1A, 1B, 1C is preferably disposed in a limited space in the air conditioning system 100. Thereby, the air conditioning system 100 is also preferably downsized. In addition, the air conditioning system 100 has high reliability because each damper 114, 116, 118, 120 is driven by each actuator 1A, 1B, 1C characterized in high torque and high speed reduction ratio.

In the air conditioning system 100, a well-known art such as a link system is applicable to the system which converts rotary movement of the output shaft 44 of each actuator 1A, 1B, 1C into reciprocative movement of each damper 114, 116, 118, 120.

The air conditioning system 100 has three motor actuators 1A, 1B, and 1C. However, as a matter of course, the number of the motor actuator 1 is changeable in response to the number of the damper. In addition, the number of the motor actuator 1 may be fewer than that of the damper. The motor actuator 1 may be applied to other systems in which at least one motor actuator is used.

(Seventh Embodiment)

Figure 17:
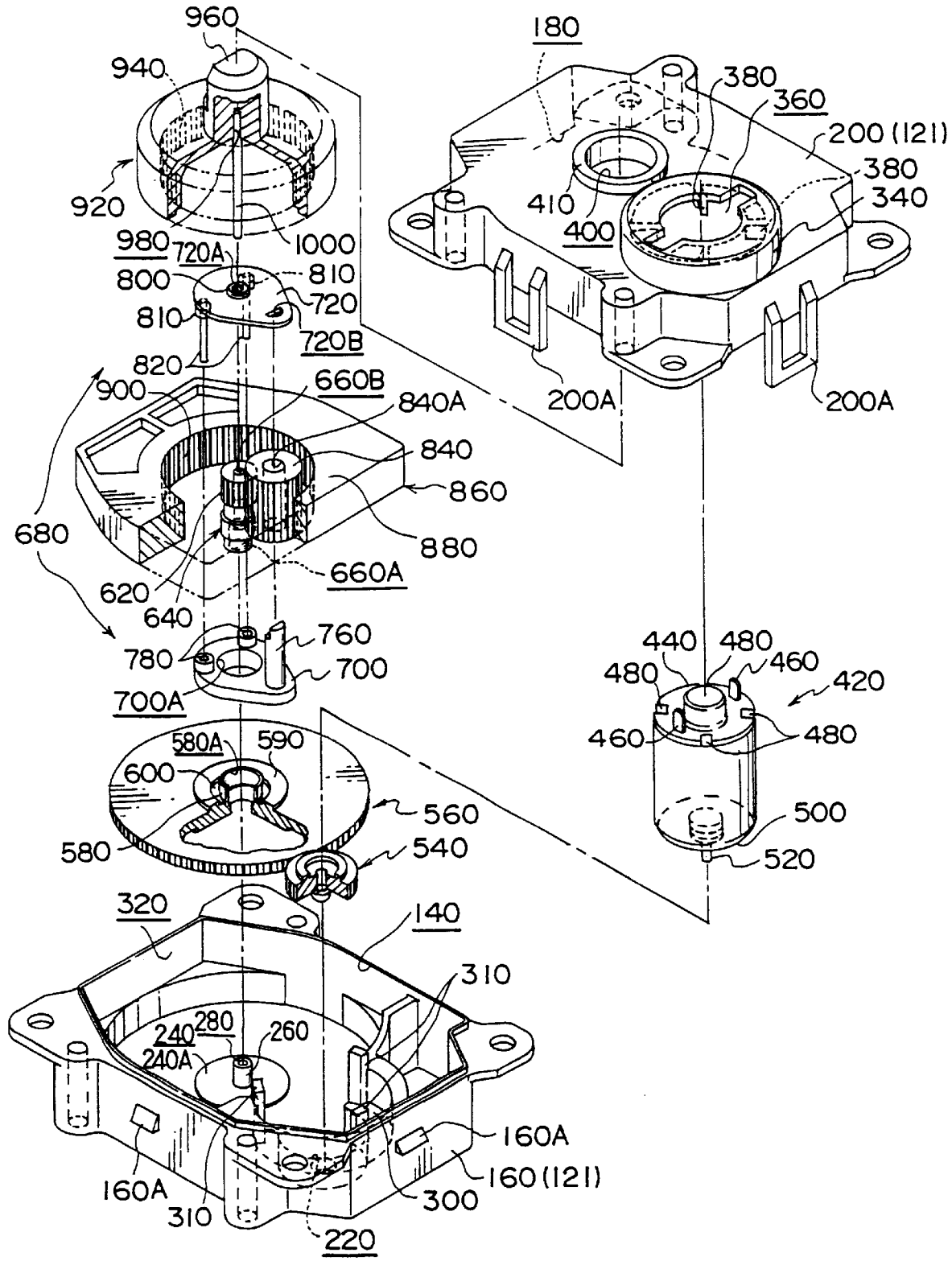
FIG. 17 an exploded perspective view of a motor actuator according to a seventh embodiment of the present invention.
Figure 18:
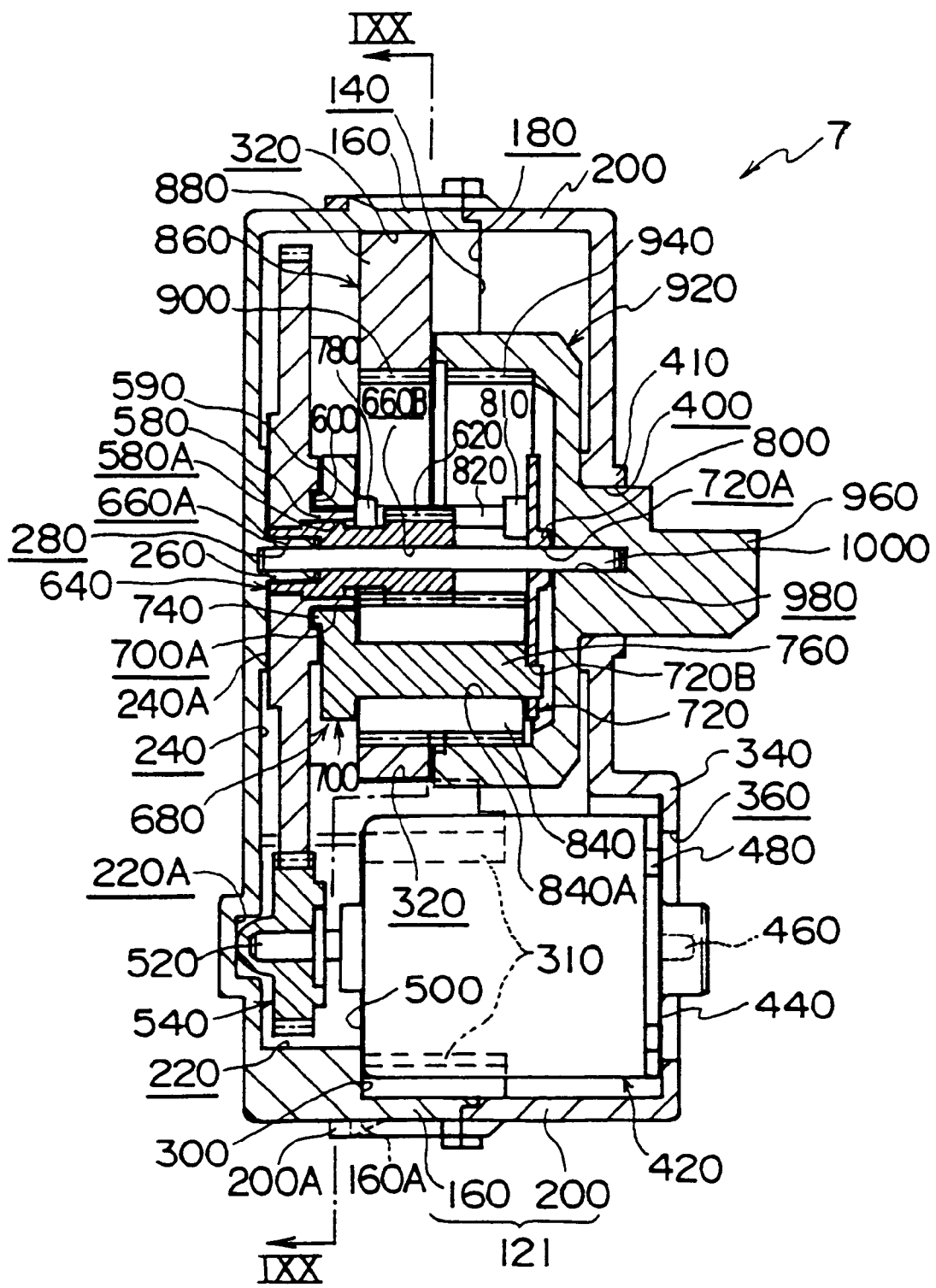
FIG. 18 is a cross-sectional view of the motor actuator according to the seventh embodiment.
Figure 19:
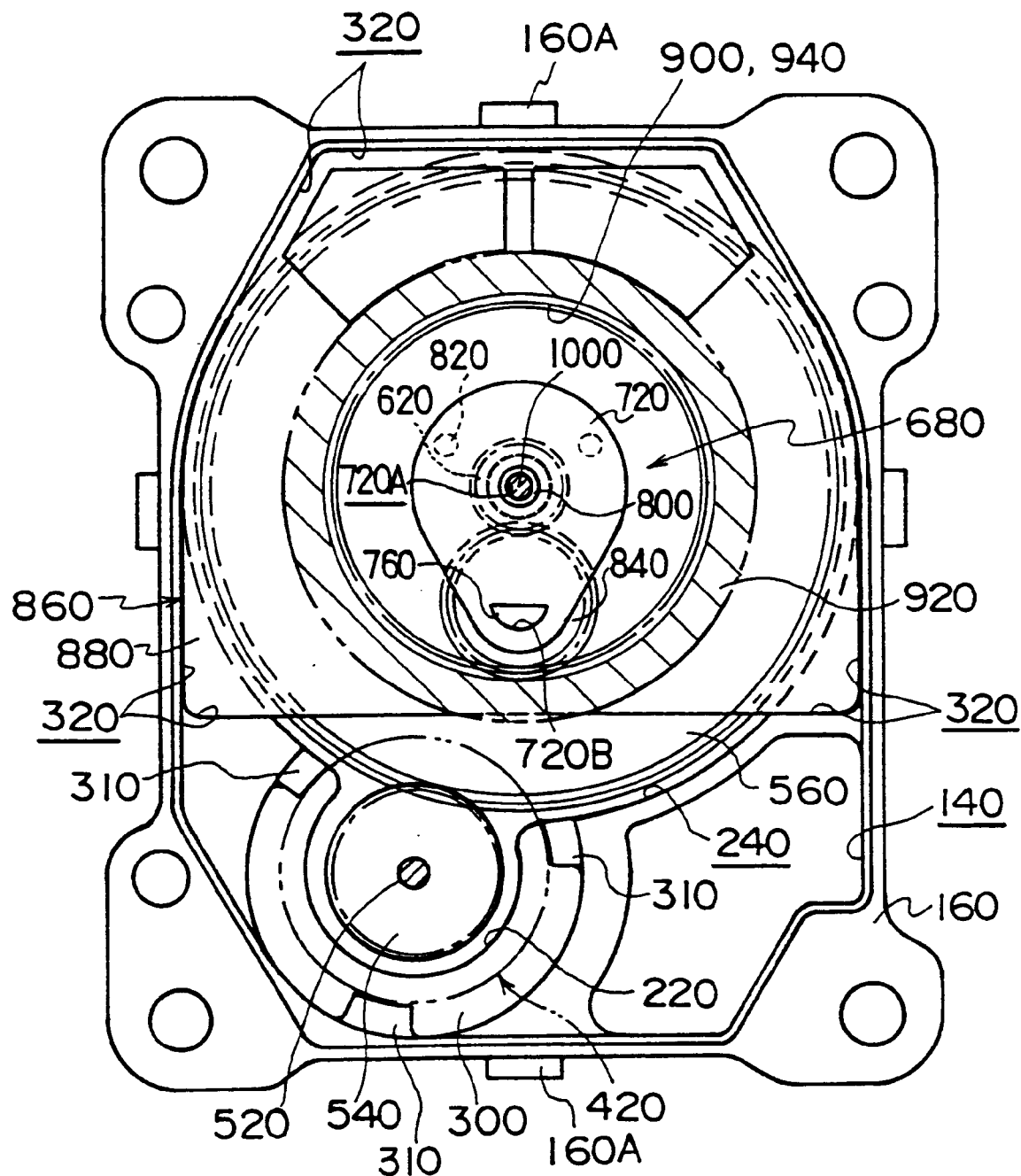
FIG. 19 is a plan view of the motor actuator taken along the line IXX—IXX in FIG. 18.

As shown in FIGS. 17 and 18, a motor actuator 7 has a housing 121 constituted of a lower case 160 having an opening 140 and an upper case 200 having an opening 180. As shown in FIG. 18, the lower case 160 has a small gear storage 220 for storing a pinion gear 540, which is a motor gear, at a corner area, a large gear storage 240 in a short cylindrical shape for storing a reduction gear 560, which is an input gear, at a central area, and an internal gear storage 320 formed on the large gear storage 240 for storing a fixed internal gear 860 which is a stationary gear. The small gear storage 220 communicates with the large gear storage 240 so that the pinion gear 540 engages with the reduction gear 560 at the boundary between the storages 220 and 240.

The storage 220 has a cavity 220A at the bottom thereof. A support step 30 and a plurality of support projections 31 are formed on the side wall extended from the small gear storage 220 toward the opening 140. The step 30 and the projections 31 respectively determine the position of a driving motor 420 in the spinning direction of the motor 420 and in the direction perpendicular to the spinning direction.

A fixed cylindrical support shaft 260 for supporting the reduction gear 560 or the like is held upright at a central area on the bottom of the gear storage 240. The support shaft 260 has a support hollow 280 for supporting rotatably a support shaft 1000. A thin disk-shaped projection is formed on the bottom surface of the gear storage 240 around the fixed support shaft 260. The thin-disk-shaped projection has a flat surface 240A on which the reduction gear 560 slides.

The upper case 200 has a motor storage 340 at the position opposing to the small gear storage 220 of the lower case 160 and a thick hub 410 defining a hub hole 400 at the position opposing to the large gear storage 240 of the lower case 160. The motor storage 340 is a partly-bottomed cylinder-shaped portion protruding from the bottom of the upper case 200, and communicates with the inner space of the upper case 200. The motor storage 340 has a hole 360 for electrical connection of the driving motor 420 at the bottom thereof and a plurality of projections 380 extending from the bottom toward the opening 180 to fix the motor 420. An output shaft 960 penetrates the upper case 200 through the hub hole 400, and is supported by the hub 410.

The lower case 160 and the upper case 200 are coupled together in a state that both openings 140 and 180 face each other, and form the housing 120 by locking a plurality of spring clips. Each spring clip consists of a female spring portion 200A and a male spring portion 160A. The female spring portion 200A is forced over the male portion in a spring-like fashion to cause the male portion 160A to lock within the female spring portion 200A.

Figure 21:
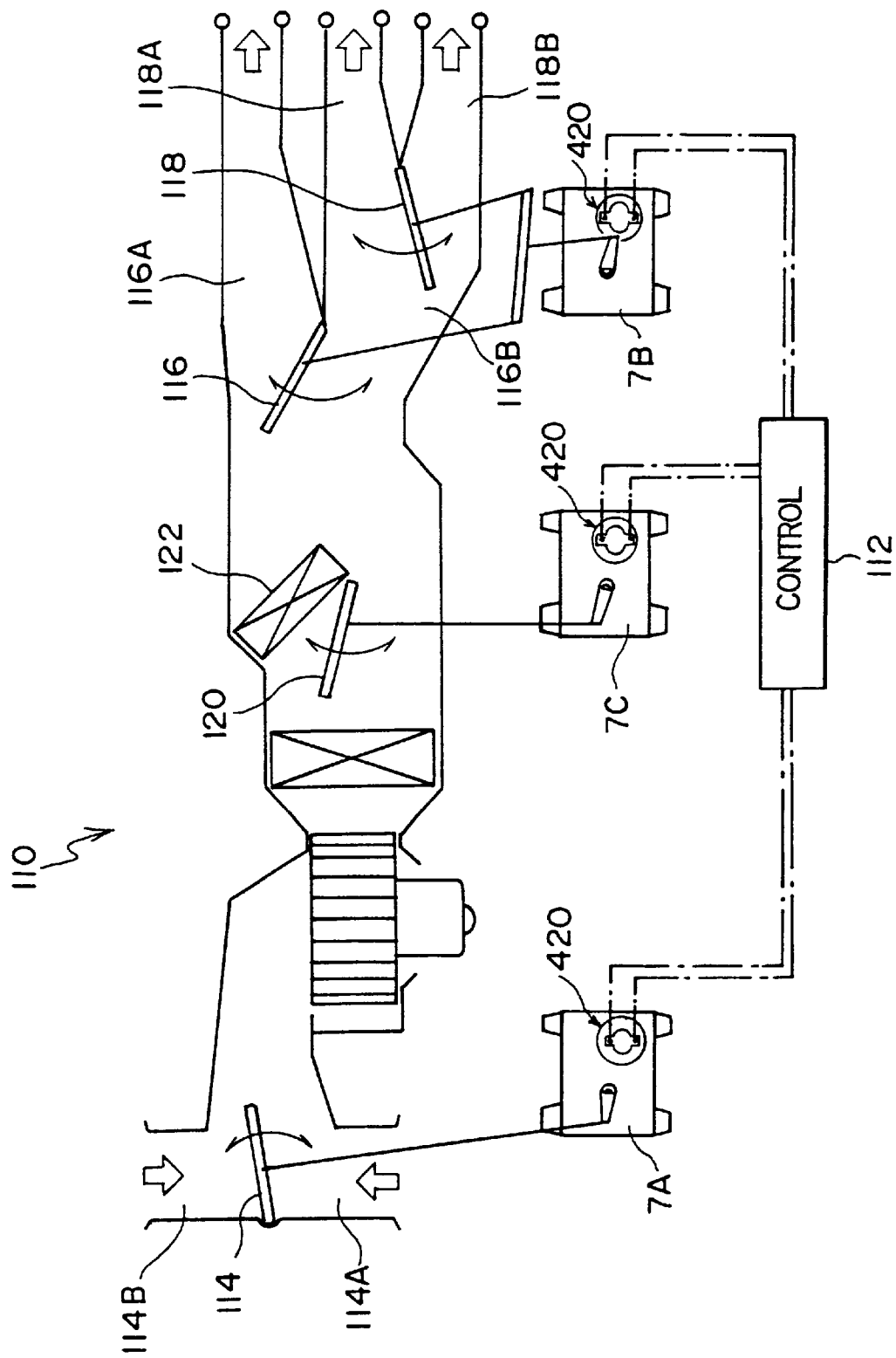
FIG. 21 is a schematic view of an air conditioning system for a vehicle to which the motor actuator according to the seventh embodiment is applied.

The motor 420 is a DC motor having a plurality of trenches 480 and a pair of terminals 460 at one end 440 thereof. Each trench 480 fits each projection 380 of the motor storage 340. The terminals 460 are electrically connected to a control unit 112, as shown in FIG. 21. The control unit 112 supplies electric power to the motor 420, and switches the rotation direction of a rotary shaft 520 on a case-by-case basis.

The pinion gear 540 having thirty-five teeth is formed on one end of the rotary shaft 520 so as to rotate coaxially and synchronously with the rotary shaft 520. The pinion gear 540 is rotatably stored in the small gear storage 220 of the lower case 160, and engages the reduction gear 560 having fifty-two teeth. The reduction gear 560 has a cylindrical shaft 580 and an annular shaped projection 590 surrounding the cylindrical shaft 580 with an annular groove 600 therebetween at the central area thereof on the side facing the opening 140. The shaft 580 has an axial hole 580A having a step on the wall defining the hole 580A.

A sun gear 620 having eleven teeth is formed at the first end of a shaft 640. A step is formed on the surface at the second end of the shaft 640. The sun gear 620 has a diameter smaller than the cylindrical shaft 580. The second end of the joint shaft 640 is inserted, and fixed to the hole 580A of the reduction gear 560, so the joint shaft 640 and the reduction gear 560 are not movable from each other. The second end has an axial cavity 660A which fits the cylindrical support shaft 260 of the gear storage 240. A small axial hole 660B extending from the bottom of the cavity 660A toward the first end is formed in the joint shaft 640. The small axial hole 660B has substantially the same diameter as that of the support hollow 280 of the support shaft 260.

The reduction gear 560 integrated with the joint shaft 640 is rotatably supported in the large gear storage 240 by inserting the cylindrical support shaft 260 into the cavity 660A, and is rotated synchronously with the sun gear 620. The reduction gear 560 engages the pinion gear 540 at the boundary between the gear storages 220 and 240 for transmitting the torque generated by the driving motor 420.

A career 680 is disposed on the reduction gear 560 at the side having the joint shaft 640. The career 680 includes a pair of teardrop-shaped plates 700 and 720, which face each other and are perpendicular to the rotation axis of the reduction gear 560. The plate 700 has a career axial hole 700A at the central area thereof, a ring-shaped rim 740, a planet gear support shaft 760, and a pair of pillar support parts 780. The career axial hole 700A fits the cylindrical shaft 580 of the reduction gear 560. The ring-shaped rim 740 facing the reduction gear 560 is formed on the plate 700 at one end of the hole 700A. The outer diameter of the ring-shaped rim 740 is smaller than the inner diameter of the annular-shaped projection 590 (the outer diameter of the annular groove 600). The planet gear support shaft 760 is formed in a cylindrical shape, and held upright on the plate 700. The upper edge of the shaft 760 is formed in a semi-cylindrical shape. Each pillar support part 780 is formed in a ring shape, and has a cavity fitting a support pillar 820.

The plate 720 has an axial hole 720A, a ring-shaped hub 800, a semicircular support pillar hole 720B, and a pair of pillar support parts 810. The axial hole 720A is formed in a coaxial relation with the hole 700A, and has an diameter substantially equal to that of the support hollow 280. The ring-shaped hub 800 formed at one end of the hole 720A on the side which does not face the plate 700. The semicircular support pillar hole 720B fits the upper edge of the shaft 760 formed in a semi-cylindrical shape. Each pillar support part 810 is formed in a ring shape, and has a cavity fitting a support pillar 820.

The plates 700 and 720 are coupled together in a parallel relation with each other by fitting the upper edge of the shaft 760 with the semi-cylindrical support pillar hole 720B and by inserting each end of the support pillar 820 into the part 780 and the part 810, respectively. Before coupling the plates 700 and 720, the shaft 760 is inserted into an axial hole 840A of a planet gear 840. The planet gear 840 has seventeen teeth, is rotatably supported by the shaft 760, and engages the sun gear 620. Each support pillar 820 doubles a counterweight for the shaft 760 and the planet gear 840.

The career 680 is supported in a state that the cylindrical shaft 580 of the reduction gear 560 is inserted into the career axial hole 700A, and the ring-shaped rim 740 fits the annular groove 600, so the career 680 is rotatable about the cylindrical shaft 580. In this configuration, the ring-shaped rim 740 contacts the annular shaped projection 590 and the annular groove 600 respectively at the side wall of the rim 740 and at the top surface of the rim 740. The career 680 rotates about the cylindrical shaft 580 while sliding on the reduction gear 560. As described above, the cylindrical shaft 580 (the career axial hole 700A) has a larger diameter the sun gear 620, so the career 680 is readily assembled to the cylindrical shaft 580.

The fixed internal gear 860 is disposed in the internal gear storage 320. The gear 860 is constituted of a support portion 880, which is approximately polygonal and supported by the gear storage 320, and a fixed internal teeth portion 900 formed on the inside wall of the support portion 880 in a coaxial relation with the sun gear 620. The internal teeth portion 900 has forty-six teeth, and engages the planet gear 840.

A planetary gear train is constituted of the sun gear 620, the career 680, the planet gear 840, and the fixed internal teeth portion 900 (the fixed internal gear 860). The sun gear 620, the career 680 (the planet gear 840), and the fixed internal teeth portion 900 (the fixed internal gear 860) are respectively an input member, an output member, and a stationary member of the planetary gear train. In the motor actuator 7, the planetary gear train is combined with a movable internal gear 920 which is an output gear.

The movable internal gear 920 is formed in a bottomed cylinder shape, has a movable internal teeth portion 940 including forty-seven teeth on the inner surface thereof, and engages the planet gear 840. The movable internal gear 920 is a profile-shifted gear having a minus value in addendum modification so that the teeth portion 940 has more teeth than the teeth portion 900 of the gear 860 by one tooth. The output shaft 960 is held upright on the outer surface of the bottom of the gear 920 in a coaxial relation with the gear 920. The shaft 960 is integrated with the gear 920, and has a diameter substantially equal to that of the hub hole 400 of the upper case 200. The upper edge of the shaft 960 is formed in a semi-cylindrical shape.

The movable internal gear 920 has an axial cavity 980 at the central part of the bottom thereof. The axial cavity 980 extends from the inner surface of the bottom into the shaft 960. One end of the support shaft 1000 is inserted into the axial cavity 980, and fixed to the gear 920. The support shaft 1000 rotates synchronously with the gear 920 and the shaft 960. The support shaft 1000 extends through the axial hole 720A of the career 680 and the small axial hole 660B of the joint shaft 640 toward the support hollow 280 of the support shaft 260. The support shaft 1000 has a diameter smaller than that of the support hollow 280, so the support shaft 260 supports rotatably the support shaft 1000.

The movable internal gear 920 slides on a surface of the ring-shaped hub 800 and on an inner surface of the upper case 200 while letting the output shaft 960 slide on a wall defining the hub hole 400. The ring-shaped hub 800 prevents the movable internal gear 920 from contacting the fixed internal gear 860.

Figure 20:
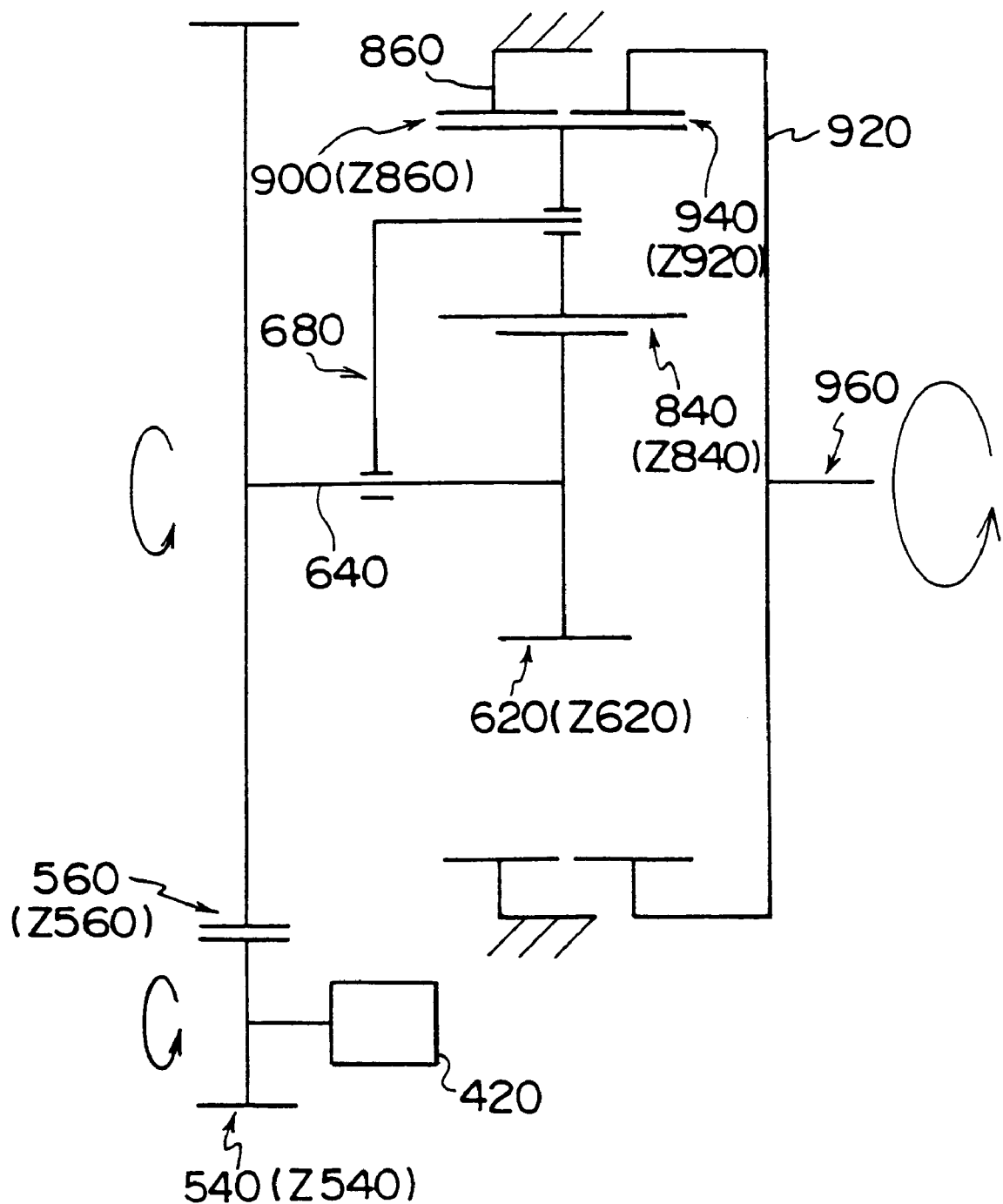
FIG. 20 is a schematic diagram of the motor actuator according to the seventh embodiment.

The motor actuator 7 has a gear drive train system in which the planetary gear train described above is combined with the movable internal gear 920. The gear system is schematically shown in FIG. 20.

In the motor actuator 7, when the control unit 112 shown in FIG. 21 supplies electric power to the motor 420 via the terminals 460, the rotary shaft 520 is rotated synchronously with the pinion gear 540 formed on an edge of the rotary shaft 520. The rotary movement of the pinion gear 540 is transmitted to the reduction gear 560, thereby the first speed reduction step is achieved. The rotational speed of the reduction gear 560 is determined by the rotational speed of the rotary shaft 520 and the first speed reduction ratio, namely the teeth ratio (35:52) of the pinion gear 540 to the reduction gear 560.

When the reduction gear 560 is rotated, the sun gear 620 is synchronously rotated because the joint shaft 640 is fixed to the reduction gear 560. The rotary movement of the sun gear 620 is transmitted to the planet gear 840. The planet gear 840 engages the fixed internal gear 860 (the fixed internal teeth portion 90), so the planet gear 840 is revolved around the sun gear 620 while being rotated about the planet gear support shaft 760 of the career 680. Thereby, the career 680 is rotated about the sun gear 620, and the second speed reduction step is achieved. The rotational speed (the revolution speed of the planet gear 840) of the career 680 is determined by the rotational speed of the sun gear 620 (the reduction gear 560) and the second speed reduction ratio, namely the ratio (11:(11+46)) of the number of teeth in the sun gear 620 to the sum of the number of teeth in the sun gear 620 and the fixed internal gear 860.

When the career 680 is rotated, the career 680 drives the movable internal gear 920 because the planet gear 840 supported by the career 680 also engages the movable gear 920. The movable gear 920 has more teeth than the fixed gear 860 by one tooth, so the movable gear 920 is rotated due to the difference in the number of teeth by the planetary movement of the planet gear 840. To be specific, when the planet gear 840 goes around the sun gear 620 once, namely when the career 680 is rotated once, the movable gear 920 is rotated by an angle equivalent to the difference in the number of teeth (in this embodiment, one tooth), thereby the third speed reduction step is achieved. The rotational speed of the movable gear 920 is determined by the rotational speed of the career 680 and the third speed reduction ratio, namely the ratio ((47-46):47) of the difference in the number of teeth between the movable gear 920 and fixed gear 860 to the number of teeth in the movable gear 920.

When the movable gear 920 is rotated, the output shaft 960, which is integrated with the movable gear 920, is synchronously rotated. The rotary movement of the output shaft 960 is transmitted to a load device such as a damper in an air conditioning system for a vehicle, which is mechanically linked to the shaft 960.

The gear drive train system in the motor actuator 7 provides a high overall speed reduction ratio (1:(35/52×11/57×1/47)) through the first reduction step to the third reduction step. Therefore, the rotational speed of the motor 420 is reduced to approximately 1/362 times, and the output torque of the motor 420 is amplified to 362 times.

In this embodiment, the overall speed reduction ratio is expressed generally in

1:(Z540/Z560)×(Z620/(Z620+Z860))×((Z920−860)/Z920). In this equation, the number of teeth in a gear is represented by attaching Z to the reference number applied to the gear described above. For example, the number of teeth in the reduction gear 560 is expressed in Z560. (Z540/Z560), (Z620/(Z620+Z860)), and ((Z920-Z860)/Z920) represent for the first, the second, and third speed reduction ratios, respectively. Therefore, it is possible to provide a preferable overall speed reduction ratio in response to the output characteristics required by a load device attached to the motor actuator 7 by altering the number of teeth in some gears on a case-by-case basis.

The movable internal gear 920 is disposed in a coaxial and parallel relation with the fixed internal gear 860 while meshing with the planetary gear 840, so the projected area in the rotation axis direction of the movable internal gear 920 is smaller than that of a conventional gear drive train constituting a plurality of spur gears, which are multiply combined with each other to provide the same speed reduction ratio as in this embodiment. Therefore, it is possible to downsize the motor actuator 7 than a motor actuator using the conventional gear drive train.

The fixed internal gear 860 is supported by the housing 120 (the lower case 160) in the radial direction of the rotation axis of the movable internal gear 920, so it is possible to suppress deformation of the gear 860 due to torque loaded on the output shaft 960, and to maintain a preferable gear mesh between the gear 860 and the planet gear 840. In addition, even when the output shaft 960 locks, an improper gear mesh between the gear 860 and the planet gear 840 is prevented.

As described above, the motor actuator 7 in this embodiment is preferably small and reliable, and provides preferable output characteristics in torque and rotational speed.

The sun gear 620 is connected to, and rotated synchronously with the reduction gear 560 which is driven at a reduced rotational speed by the motor 420 via the pinion gear 540, so the gear dive train system and the driving motor 420 are disposed in a compact layout with a high speed reduction ratio. Thereby, the motor actuator 7 having high speed reduction ratio is preferably downsized.

The fixed internal gear 860 is fixed to the housing 120 (the lower case 160) only by fitting the support portion 880 into the internal gear storage 320 without using a connecting member such as a bolt and a screw, so the structure of the gear 860 is simple, and the number of parts is reduced. Thereby, the production cost of the motor actuator 7 is decreased. In addition, in this embodiment, only one planet gear 840 is used, so the design of the gear drive train becomes easy. The career 680 supporting the planet gear 840 has a counterweight for the shaft 760 and the planet gear 840, so it is possible to prevent unfavorable mechanical noise and vibration due to shaft imbalance caused when the planet gear 840 is revolved. The counterweight is the support pillar 820 which bridges the plates 70 and 72, so the number of parts is reduced further, and the production cost of the motor actuator 7 is decreased further.

In this embodiment, the fixed internal gear 860 is fixed to the lower case 160 by fitting the support portion 880 into the internal gear storage 320. However, the gear 860 may be fixed to the lower case 160 by welding or bonding, or may be formed as a part of the lower case 160. The shape of the support portion 880 (the shape of the gear storage 320) need not be polygonal. Other shape, except for a circle in a coaxial relation with the fixed internal teeth portion 900, may be applied on a case-by-case basis. The housing 120 need not be constituted of the lower case 160 and the upper case 200. The housing 120 may be constituted of a main case having two opposing openings, and two lids covering the openings. This constitution is preferable used if the fixed internal gear 860 is formed as a part of the main case and other members such as gears are disposed on both sides of the gear 860.

In this embodiment, the rotary movement transmitted from the motor 420 to the sun gear is slowed down by the pinion gear 540 and the reduction gear 560. However, instead of the gears 540 and 560, a worm and a worm wheel may be used, or the sun gear 620 may be driven directly by the motor 420. The reduction between the sun gear 620 and the motor 420 may be multiple according to the required speed reduction ratio.

In this embodiment, only one planet gear 840 is used. However, the number of the planet gear 840 may be plural. In that case, it is possible to omit the counterweight (the support pillar 820) formed in the career 680. The career 680 is not any of the input, stationary or output members, so the motor actuator 7 may be a structure which does not include the career 680.

In this embodiment, the movable internal gear 920 and the output shaft 960 are integrated. However, the gears 920 and 960 may be formed separately. In that case, the output shaft 960 may be driven by the movable internal gear 920 via an intermediate member interposed therebetween. The intermediate member may be a damper which functions in the case that the output shaft 960 locks. The intermediate member may be a means for slowing down the transmitted rotary movement.

The air conditioning system 110 for a vehicle, to which the motor actuator 7 is applied, is shown in FIG. 21. The operation of damper control in the system 110 is basically the same as in the air conditioning system 100 described above with reference to FIG. 16.

In the system 110, the air conditioning system 110 has three motor actuators 7 denoted respectively by 7A, 7B, and 7C. The terminal of the driving motor 420 in each motor actuator 7A, 7B, 7C is electrically connected to a controller 112, and the motor 420 is driven clockwise or counterclockwise in response to the signal from the controller 112. The motor actuator 7A is mechanically connected to, and drives a damper 114. The motor actuator 7B is mechanically connected to, and drives dampers 116 and 118. The motor actuator 7C is mechanically connected to, and drives damper 120.

Each motor actuator 7A, 7B, 7C is downsized by using the gear drive system described above, so each actuator 7A, 7B, 7C is preferably disposed in a limited space in the air conditioning system 110. Thereby, the air conditioning system 110 is also preferably downsized. In addition, the air conditioning system 110 has preferable reliability because each damper 114, 116, 118, 120 is driven by each actuator 7A, 7B, 7C characterized in high torque and high speed reduction ratio.

In this embodiment, the air conditioning system 110 has three motor actuators 7A, 7B, and 7C. However, as a matter of course, the number of the motor actuator 7 is changeable in response to the number of the damper. In addition, the number of the motor actuator 7 may be fewer than that of the damper.

In this embodiment, the motor actuator 7 is applied to the air conditioning system 110 for a vehicle. However, the motor actuator 7 may be applied to other systems in which at least one motor actuator is used.

What is claimed is:

1. A motor actuator comprising:

a driving motor;

a motor gear formed on a rotary shaft of the driving motor;

an input gear operatively coupled with the motor gear;

a planet gear disposed to revolve around a rotation axis of the input gear when the input gear is rotated;

a stationary gear which is fixed in a coaxial relation with the input gear, and meshes with the planet gear; and an output gears which is disposed rotatably in a coaxial relation with the input gear, wherein the output gear has an output shaft and teeth, the number of which is different from that of the stationary gear, and wherein the output gear meshes with the planet gear.

2. The motor actuator as in claim 1, wherein:

the planet gear is disposed to revolve outside the stationary gear and the output gear.

3. The motor actuator as in claim 2, wherein:

the input gear is hollow and generally cup-shaped, and has teeth on an outer surface thereof;

the stationary gear has teeth on an outer surface thereof, which is disposed inside the input gear; and the output gear has teeth on an outer surface thereof.

4. The motor actuator as in claim 3, further comprising an input gear lid which is generally cup-shaped and which has having a hole at a central area of the bottom, wherein:

the output shaft penetrates the input gear lid through the hole; and the input gear lid is attached to the input gear to substantially shield an inner space of the input gear.

5. The motor actuator as in claim 4, wherein:

the input gear has a projection on an inner surface thereof; and the input gear lid has a slit which fits the projection.

6. The motor actuator as in claim 3, further comprising a housing which stores the driving motor and all the gears.

7. The motor actuator as in claim 6, wherein:

the housing has a cavity;

the stationary gear has a shaft;

the input gear has a hole formed in a central area of the bottom thereof; and the shaft penetrates the input gear through the hole and is fixed to the cavity.

8. The motor actuator as in claim 3, wherein:

the motor gear is a worm; and the input gear is a worm wheel having a rotation axis perpendicular to that of the worm.

9. The motor actuator as in claim 3, wherein:

the input gear has a plurality of support pillars;

the planet gear is supported by one of the support pillars; and at least one of the pillars, which does not support the planet gear, has a larger diameter than a pillar supporting the planet gear for improving shaft balance of the input gear.

10. The motor actuator as in claim 3, wherein:

the input gear has a part on a side wall thereof having a larger thickness than the rest of the side wall for improving shaft balance of the input gear.

11. The motor actuator as in claim 1, further comprising:

an intermediate gear engaging the motor gear and the input gear.

12. The motor actuator as in claim 11, wherein:

the intermediate gear has a large gear engaging the motor gear and a small gear engaging the input gear, which is integrated with the large gear in a coaxial relation, and has a smaller diameter than the large gear.

13. The motor actuator as in claim 11, wherein:

The input gear is disposed in a range defined by an overall length of the driving motor and the motor gear.

14. The motor actuator as in claim 1, wherein:

the planet gear is disposed to revolve inside the stationary gear and the output gear.

15. The motor actuator as in claim 14, wherein:

the input gear is in the shape of a disk, and has teeth on an outer circumferential surface thereof;

the stationary gear has teeth on an inner wall thereof; and the output gear has teeth on an inner wall thereof.

16. The motor actuator as in claim 15, further comprising:

a housing which stores the driving motor and all the gears, and supports the stationary gear in a radial direction thereof.

17. The motor actuator as in claim 16, wherein more than half of a periphery of the stationary gear is formed in a shape fitting an inner surface of the housing to fix the stationary gear to the housing.

18. The motor actuator as in claim 16, wherein the stationary gear and the housing are integrated together.

19. The motor actuator as in claim 15, further comprising:

a sun gear which is fixed to the input gear in a coaxial relation so as to be rotated synchronously with the input gear, and meshes with the planet gear.

20. The motor actuator as in claim 15, further comprising:

a career which is supported rotatably in a coaxial relation with the input gear, and has a counter weight against the planet gear, wherein:

a single planet gear is rotatably supported by the career.

21. The motor actuator as in claim 20, wherein the career has:

a pair of plate facing each other; and a plurality of support pillars bridging the plate, wherein:

the planet gear is supported by one of the support pillars; and at least one of the support pillars, which does not support the planet gear, functions as a counterweight.

22. The motor actuator as in claim 1, wherein:

the output shaft is linked to a damper of an air conditioner for a vehicle to open and close the damper by clockwise and counterclockwise spinning of the driving motor.

23. The motor actuator as in claim 1, wherein:

the driving motor and the input gear are different in rotational axis from each other and disposed side by side.

24. The motor actuator as in claim 23, wherein rotational axes of the driving motor and the input gear are substantially perpendicular to each other.

25. The motor actuator as in claim 23, wherein rotational axes of the driving motor and the input gear are substantially parallel to each other.

26. A motor actuator comprising:

a driving motor;

a motor gear formed on a rotary shaft of the driving motor;

an input gear operatively coupled with the motor gear, wherein the input gear is hollow and generally cup-shaped and has teeth on an outer surface thereof;

a planet gear disposed to revolve around a rotation axis of the input gear when the input gear is rotated;

a stationary gear which is fixed in a coaxial relation with the input gear, and meshes with the planet gear, wherein the stationary gear has teeth on an outer surface thereof, which is located inside the input gear; and an output gear, which is rotatable and coaxial with the input gear, wherein the output gear has an output shaft and teeth, the number of which is different from that of the stationary gear, and the output gear meshes with the planet gear, and wherein the output gear has teeth on an outer surface thereof.

27. The motor actuator as in claim 26, further comprising an input gear lid which is cup-shaped and which has a hole at a central area of a bottom of the cup-shape, wherein:

the output shaft penetrates the input gear lid through the hole; and the input gear lid is attached to the input gear to substantially shield an inner space of the input gear.

28. The motor actuator as in claim 27, wherein:

the input gear has a projection on an inner surface thereof; and the input gear lid has a slit which fits the projection.

29. The motor actuator as in claim 26, wherein:

the housing has a cavity;

the stationary gear has a shaft;

the input gear has a hole formed in a central area of the bottom thereof; and the shaft penetrates the input gear through the hole and is fixed to the cavity.

30. The motor actuator as in claim 26, wherein:

the motor gear is a worm; and the input gear is a worm wheel having a rotation axis perpendicular to that of the worm.

31. The motor actuator as in claim 26, wherein the driving motor and the input gear are located side by side and have different rotational axes.

32. The motor actuator as in claim 31, wherein rotational axes of the driving motor and the input gear are substantially perpendicular to each other.

33. The motor actuator as in claim 26, wherein the number of teeth of the output gear is larger than that of the stationary gear.

* * * * *